(12) United States Patent
Choi et al.

(10) Patent No.: US 8,034,508 B2
(45) Date of Patent: *Oct. 11, 2011

(54) POLYBENZOXAZINE-BASED COMPOUND, ELECTROLYTE MEMBRANE INCLUDING THE SAME, AND FUEL CELL EMPLOYING THE ELECTROLYTE MEMBRANE

(75) Inventors: Seong-woo Choi, Yongin-si (KR); Hee-young Sun, Yongin-si (KR); Myung-jin Lee, Seoul (KR); Woo-sung Jeon, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1413 days.

This patent is subject to a terminal disclaimer.

(21) Appl. No.: 11/514,254

(22) Filed: Sep. 1, 2006

(65) Prior Publication Data
US 2007/0141426 A1 Jun. 21, 2007

(30) Foreign Application Priority Data

Sep. 3, 2005 (KR) .................. 10-2005-0081994
Sep. 3, 2005 (KR) .................. 10-2005-0081995

(51) Int. Cl.
*H01M 8/10* (2006.01)
*C08G 73/06* (2006.01)
(52) U.S. Cl. .................. 429/492; 429/491; 528/423
(58) Field of Classification Search .................. 429/304, 429/306, 309, 491, 492; 528/423
See application file for complete search history.

(56) References Cited

U.S. PATENT DOCUMENTS

| 5,098,985 A | 3/1992 | Harris et al. |
| 5,152,939 A | 10/1992 | Ishida |
| 5,410,012 A | 4/1995 | Connell et al. |
| 5,525,436 A * | 6/1996 | Savinell et al. .................. 429/30 |
| 5,637,670 A | 6/1997 | Connell et al. |

(Continued)

FOREIGN PATENT DOCUMENTS

CN 101220153 7/2008

(Continued)

OTHER PUBLICATIONS

Search Reports issued in European Patent Application No. 06254551.2-2115 on Nov. 21, 2006.

(Continued)

*Primary Examiner* — Patrick Ryan
*Assistant Examiner* — Julian Anthony
(74) *Attorney, Agent, or Firm* — Lee & Morse, P.C.

(57) ABSTRACT

A crosslinked object of a polybenzoxazine-based compound formed of a polymerized resultant of a first monofunctional benzoxazine-based monomer or a second multifunctional benzoxazine-based monomer with a crosslinkable compound, an electrolyte membrane including the crosslinked object, a method of preparing the electrolyte membrane, and a fuel cell employing the electrolyte membrane including the crosslinked object. The crosslinked object has a strong acid trapping capability with respect to the benzoxazine-based compound and high mechanical properties due to the crosslinking. The crosslinked object is very stable chemically because of elimination of solubility in polyphosphoric acid. The electrolyte membrane including the crosslinked object has excellent phosphoric acid supplementing capacity at a high temperature and mechanical and chemical stability. Specifically, even when an impregnated amount of a proton carrier, such as phosphoric acid, is increased to increase proton conductivity, the electrolyte membrane maintains excellent mechanical and chemical stability. Accordingly, the electrolyte membrane can be used in a fuel cell for high temperature and no humidity.

25 Claims, 16 Drawing Sheets

U.S. PATENT DOCUMENTS

| | | | |
|---|---|---|---|
| 5,945,233 A | 8/1999 | Onorato et al. | |
| 6,042,968 A | 3/2000 | Onorato et al. | |
| 6,482,946 B1 | 11/2002 | Dettloff et al. | |
| 6,620,905 B1 | 9/2003 | Musa | |
| 6,746,792 B2 * | 6/2004 | Hasegawa et al. | 429/454 |
| 7,157,509 B2 | 1/2007 | Li et al. | |
| 7,371,480 B2 * | 5/2008 | Ono et al. | 429/33 |
| 7,388,035 B2 | 6/2008 | Kim et al. | |
| 2002/0127474 A1 | 9/2002 | Fleischer et al. | |
| 2002/0164516 A1 | 11/2002 | Hasegawa et al. | |
| 2003/0190516 A1 | 10/2003 | Tanno | |
| 2004/0005493 A1 | 1/2004 | Tanno | |
| 2004/0028976 A1 | 2/2004 | Cabasso et al. | |
| 2004/0074651 A1 | 4/2004 | Christensen et al. | |
| 2004/0206953 A1 | 10/2004 | Morena et al. | |
| 2004/0231143 A1 | 11/2004 | Visco et al. | |
| 2004/0241522 A1 * | 12/2004 | Ono et al. | 429/34 |
| 2004/0261660 A1 | 12/2004 | Li et al. | |
| 2005/0074651 A1 | 4/2005 | Kidai et al. | |
| 2005/0084728 A1 | 4/2005 | Kim et al. | |
| 2005/0089744 A1 | 4/2005 | Kim et al. | |
| 2005/0130006 A1 | 6/2005 | Hoshi et al. | |
| 2005/0142413 A1 | 6/2005 | Kimura et al. | |
| 2005/0247908 A1 | 11/2005 | Keller et al. | |
| 2006/0078774 A1 | 4/2006 | Uensal et al. | |
| 2007/0020507 A1 | 1/2007 | Kim et al. | |
| 2007/0184323 A1 | 8/2007 | Lee et al. | |
| 2007/0200994 A1 | 8/2007 | Yanagisawa | |
| 2007/0275285 A1 | 11/2007 | Choi et al. | |
| 2008/0020264 A1 | 1/2008 | Sun et al. | |
| 2008/0045688 A1 | 2/2008 | Lin et al. | |
| 2008/0118817 A1 | 5/2008 | Lee et al. | |
| 2008/0145743 A1 | 6/2008 | Choi et al. | |
| 2009/0075147 A1 | 3/2009 | Kitamura et al. | |

FOREIGN PATENT DOCUMENTS

| | | |
|---|---|---|
| DE | 2034887 | 1/1972 |
| DE | 60302673 T2 | 8/2006 |
| EP | 1 247 844 | 10/2002 |
| EP | 1 247 884 | 10/2002 |
| EP | 1 253 661 | 10/2002 |
| EP | 1 760 110 | 3/2007 |
| EP | 1 881 549 | 1/2008 |
| JP | 5-283082 | 10/1993 |
| JP | 10-025343 | 1/1998 |
| JP | 11-503262 | 3/1999 |
| JP | 11-97011 | 4/1999 |
| JP | 2001-270891 | 10/2001 |
| JP | 2002-260682 | 9/2002 |
| JP | 2003-12747 | 1/2003 |
| JP | 2003-012924 | 1/2003 |
| JP | 2003-286320 | 10/2003 |
| JP | 2004-043547 | 2/2004 |
| JP | 2004-103494 | 4/2004 |
| JP | 2004-149779 | 5/2004 |
| JP | 2004-179514 | 6/2004 |
| JP | 2005-041936 | 2/2005 |
| JP | 2005-82690 | 3/2005 |
| JP | 2005-283082 | 10/2005 |
| JP | 2006-339065 | 12/2006 |
| KR | 10-2006-0011831 | 2/2006 |
| KR | 10-2006-0055291 | 5/2006 |
| KR | 10-2007-0025626 | 3/2007 |
| KR | 10-2007-0025627 | 3/2007 |
| KR | 10-2007-0102579 | 10/2007 |
| WO | WO 96/13872 | 5/1996 |
| WO | WO 02/14334 | 2/2002 |
| WO | WO 02/057279 | 7/2002 |
| WO | WO 03/072638 | 9/2003 |
| WO | WO 03/072638 A1 | 9/2003 |
| WO | WO 2004/009708 | 1/2004 |
| WO | WO 2004/024791 A1 | 3/2004 |
| WO | WO 2004/101509 A2 | 11/2004 |
| WO | WO 2005/000955 | 1/2005 |
| WO | WO 2006/132207 | 12/2006 |

OTHER PUBLICATIONS

Hajime Kimura et al. "Epoxy Resin Cured by Bisphenol A Based Benzoxazine.", Journal of Applied Polymer Science (1998), vol. 68, pp. 1903-1910.

U.S. Appl. No. 11/514,831, filed Sep. 5, 2006, Myung-jin Lee et al., Samsung Electronics Co., Ltd.

U.S. Appl. No. 11/743,778, filed May 3, 2007, Seong-woo Choi et al., Samsung Electronics Co., Ltd.

U.S. Appl. No. 11/856,350, filed Sep. 17, 2007, Seong-woo Choi et al., Samsung Electronics Co., Ltd.

U.S. Appl. No. 12/247,388, filed Oct. 8, 2008, Seong-woo Choi et al., Samsung Electronics Co., Ltd.

U.S. Appl. No. 12/208,664, filed Sep. 11, 2008, Seong-woo Choi et al., Samsung Electronics Co., Ltd.

U.S. Appl. No. 12/263,011, filed Oct. 31, 2008, Seong-woo Choi et al., Samsung Electronics Co., Ltd.

U.S. Appl. No. 12/262,854, filed Oct. 31, 2008, Seong-woo Choi et al., Samsung Electronics Co., Ltd.

U.S. Appl. No. 11/947,011, filed Nov. 29, 2007, Seong-woo Choi et al., Samsung Electronics Co., Ltd.

U.S. Appl. No. 12/266,039, filed Nov. 6, 2008, Seong-woo Choi et al., Samsung Electronics Co., Ltd.

U.S. Appl. No. 12/208,492, filed Sep. 11, 2008, Seong-woo Choi et al., Samsung Electronics Co., Ltd.

U.S. Appl. No. 11/765,033, filed Jun. 19, 2007, Hee-young Sun et al., Samsung Electronics Co., Ltd.

U.S. Appl. No. 11/765,056, filed Jun. 19, 2007, Kyung-jung Kwon et al., Samsung Electronics Co., Ltd.

Office Action issued by Japanese Patent Office in Japanese Patent Application No. 2006-239572 on Mar. 2, 2009.

B.Antalek. "Using Pulsed Gradient Spin Echo NMR for Chemical Mixture Analysis: How to Obtain Optimum Results.", Concepts in Magnetic Resonance (2002) vol. 14(4), pp. 225-258.

S. Viel et al. "Diffusion-Ordered NMR Spectroscopy: A Versatile Tool for the Molecular Weight Determination of Uncharged Polysaccharides.", Biomacromolecules (2003) vol. 4, pp. 1843-1847.

D. A. Jayawickrama et al. "Polymer additives mixture analysis using pulsed-field gradient NMR spectroscopy.", Magn.Reson. Chem (1998), vol. 36, pp. 755-760.

K. Nishinari et al. "Soulution Properties of Pullulan.", Macromolecules (1991) vol. 24, pp. 5590-5593.

L. Van Gorkom et al. "Analysis of DOSY and GPC-NMR Experiments on Polymers by Multivariate Curve Resolution.", Journal of Magnetic Resonance (1998) vol. 130, pp. 125-130.

A. Chen et al. "Determination of Molecular Weight Distributions for Polymers by Diffusion-Ordered NMR.", J. Am. Chem. Soc. (1995) vol. 117, pp. 7965-7970.

Schuster, Martin F.H., et al., "Anhydrous Proton-Conducting Polymers", Annu. Rev. Mater. Res., vol. 33, 2003, pp. 233-261.

Yamada, M. et al., "Anhydrous proton conducting polymer electrolytes based on poly(vinylphosphonic acid)-heterocyclic composite material", Polymer, vol. 46, No. 9, 2005, pp. 2986-2992.

Pu, H., et al., "Proton Transport in Polybenzimidazole Blended with $H_3PO_4$ or $H_2SO_4$", J. Polymer Science, Part B: Polymer Physics, vol. 40, 2002, pp. 663-669.

Kim, Hyoung-Juhn et al. *Polybenzimidazoles for High Temperature Fuel Cell Application*. Macromol. Rapid Commun. 2004, vol. 25, pp. 1410-1413.

Ueda, Mitsuru et al. *Poly(benzimidazole) Synthesis by Direct Reaction of Methoxyphthalic Acids and Tetramine*. J. Poly. Sci. Part A: Polym. Chem, 27 pp. 2815-2818 (1989).

Choi et al., "Synthesis, characterization and thermal degradation of functional benzoxazine monomers and polymers containing phenylphosphine oxide", Polymer Degradation and Stability, vol. 91, No. 5, May 1, 2006, pp. 1166-1178.

Low, Hong Yee, et al. "Structural Effects of Phenols on the Thermal and Thermo-oxidative Degradation of Polybenzoxazines". Polymer, vol. 40, No. 15. Jul. 1999. pp. 4365-4376.

Kim, H.J., et al. "Synthesis and Thermal Characterization of Polybenzoxazines Based on Acetylene-functional Monomers". Polymer, vol. 40, No. 23. Nov. 1999. pp. 6565-6573.

Shen, Shyan Bob, et al. "Synthesis and Characterization of Polyfunctional Naphthoxazines and Related Polymers". Journal of Applied Polymer Science vol. 61, No. 9. 1996, pp. 1595-1605.

Lin et al., "Synthesis and Properties of Flame-Retardant Benzoxazines by Three Approaches", Journal of Polymer Science, Part A: Polymer Chemistry, vol. 44, 2006, pp. 3454-3468.

Hirai et al., "Air-Induced *anti*-Markovnikov Addition of Secondary Phosphine Oxides and H-Phosphinates to Alkenes", National Institute of Advanced Industrial Science and Technology, Organic Letters 2007, vol. 9, No. 1, pp. 53-55.

Beletskaya et al., "Arylation of 6*H*-Dibenzo[c,e][1,2 $\lambda^5$]oxaphosphinine 6-Oxide", Russian Journal of Organic Chemistry, vol. 40, No. 12, 2004, pp. 1782-1786.

Yamada et al., "A Novel Synthesis of 6-Hydroxyalkyl- and 6-Hydroxy-aralkyl-6*H*-dibenz[*c,e*][1,2]oxaphosphorin 6-Oxides", vol. 27, 1990, pp. 845-850.

Human translation of JP 2003-286320, A. Takeichi et al., Oct. 2003.

Human translation of JP 2004-103494, Kimura et al., Apr. 2004.

Machine translation of JP 2004-149779, Sakaguchi et al., May 2004.

European Office Action issued in corresponding European Patent Application No. 07250814.6 on Oct. 30, 2007.

European Search Report issued in European Patent Application No. 08104319.2 on Oct. 13, 2008.

European Search Report issued in European Patent Application No. 08157494.9 on Nov. 24, 2008.

European Office Action issued in corresponding EP Application No. 08164095.5 on Dec. 4, 2008.

European Search Report issued in European Patent Application No. 08164096.3 on Jan. 20, 2009.

European Search Report issued in European Patent Application No. 08166328.8 on Jan. 22, 2009.

European Search Report issued in European Patent Application No. 08168081.1 on Jan. 28, 2009.

Extended European Search Report issued in European Patent Application No. 08168032.4 on Feb. 3, 2009.

European Search Report issued in European Patent Application No. 08168404.5 on Feb. 10, 2009.

Extended European Search Report issued in European Patent Application No. 08168404.5 on Apr. 23, 2009.

Kimura, et al.; Epoxy Resin Cured by Bisphenol A Based Benzoxazine; Oct. 18, 1997; 1903—1910; Osaka Municipal Technical Research Institute; Osaka, Japan.

Ishida, et al.; Regioselectivity of the Ring-Opening Polymerization of Monofunctional Alkyl-Substituted Aromatic Amine-Based Benzoxazines; Polymer; Jun. 12, 2000; 3115-3125; 42 Elsevier; Cleveland, OH, USA.

European Office Action in EP 10163034.1-2115, dated Jul. 19, 2010 (Choi, et al.), European Office Action from prosecution of corresponding European application.

\* cited by examiner

POLYBENZOXAZINE-BASED COMPOUND, ELECTROLYTE MEMBRANE INCLUDING THE SAME, AND FUEL CELL EMPLOYING THE ELECTROLYTE MEMBRANE

CROSS-REFERENCE TO RELATED PATENT APPLICATIONS

This application claims the benefit of Korean Patent Application Nos. 2005-81994 and 2005-81995, both filed Sep. 3, 2005, in the Korean Intellectual Property Office, the disclosures of which are incorporated herein in their entirety by reference.

BACKGROUND OF THE INVENTION

1. Field of the Invention

Aspects of the present invention relate to a polybenzoxazine-based compound, an electrolyte membrane including the same, and a fuel cell employing the same, and more particularly, to a novel polybenzoxazine-based compound, an electrolyte membrane of a fuel cell for a high temperature and no humidity, and a fuel cell employing the electrolyte membrane.

2. Description of the Related Art

In conventional ionic conductors, ions are moved by applying a voltage. Ionic conductors are widely used in electrochemical devices, such as fuel cells, electrochemical sensors, and the like.

For example, in terms of energy generating efficiency, system efficiency, and component durability, fuel cells require a proton conductor that shows long-term stable proton conductivity at an operating temperature of 100 to 300° C. under zero humidity conditions or low-humidity conditions with a relative humidity of less than 50%.

The above requirements have been considered in the development of conventional solid polymer-type fuel cells. However, solid polymer-type fuel cells that include a perfluorocarbonsulfonic acid membrane as an electrolyte membrane generate insufficient energy at an operating temperature of 100 to 300° C. in a relative humidity of 50% or less.

Conventional fuel cells include fuel cells using an electrolyte membrane containing a proton conducting agent, fuel cells using a silica diffusion membrane, fuel cells using an inorganic-organic composite membrane, fuel cells using a phosphoric acid-doped graft membrane, and fuel cells using an ionic liquid composite membrane.

In addition, a solid polymer electrolyte membrane formed of polybenzimidazole (PBI) in which a strong acid, such as a phosphoric acid or the like, is doped is disclosed (in U.S. Pat. No. 5,525,436). In such an electrolyte membrane, ionic conductivity is increased by phosphoric acid doping, but the phosphoric acid doping causes mechanical properties of the electrolyte membrane to deteriorate. In particular, PBI doped with a strong acid such as a phosphoric acid lacks mechanical strength and chemical stability at high temperatures, and liquid supplementing capability of the phosphoric acid decreases.

SUMMARY OF THE INVENTION

Aspects of the present invention provide a polybenzoxazine-based compound having excellent acid trapping capacity, mechanical and chemical stability, and phosphoric acid supplementing capacity at a high temperature, an electrolyte membrane including the same, and a method of preparing the electrolyte membrane. Aspects of the present invention also provide a fuel cell having excellent fuel efficiency and generation efficiency by employing the above electrolyte membrane.

According to an aspect of the present invention, there is provided a crosslinked object of a polybenzoxazine-based compound formed of a polymerized resultant product of a first benzoxazine-based monomer represented by Formula 1 below or a second benzoxazine-based monomer represented by Formula 2 below with a crosslinkable compound:

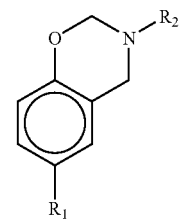

(1)

wherein $R^1$ is hydrogen, a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C2-C20 heteroaryl group, a substituted or nonsubstituted C4-C20 cycloalkyl group or a substituted or nonsubstituted C2-C20 heterocyclic group, a halogen atom, a hydroxyl group, or a cyano group; and $R_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group;

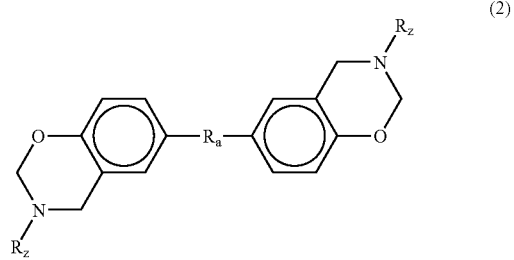

(2)

wherein, $R_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group; and $R_3$ is a substituted or nonsubstituted C1-C20 alkylene group, a substituted or nonsubstituted C1-C20 alkenylene group, a substituted or nonsubstituted C1-C20 alkynylene group, a substituted or nonsubstituted C6-C20 arylene group, a substituted or nonsubstituted C2-C20 heteroarylene group, —C(=O)—, or —SO$_2$—.

According to another aspect of the present invention, there is provided a crosslinked object of a polybenzoxazine-based compound formed of a polymerized resultant product of a first benzoxazine-based monomer represented by Formula 1 below or a second benzoxazine-based monomer represented by Formula 2 below:

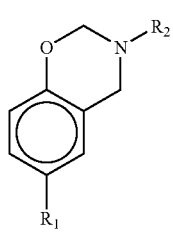

(1)

wherein R$^1$ is hydrogen, a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C2-C20 heteroaryl group, a substituted or nonsubstituted C4-C20 cycloalkyl group or a substituted or nonsubstituted C2-C20 heterocyclic group, a halogen atom, a hydroxyl group, or a cyano group; and R$_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group;

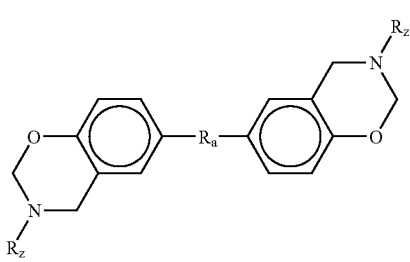

(2)

wherein, R$_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group; and R$_3$ is a substituted or nonsubstituted C1-C20 alkylene group, a substituted or nonsubstituted C1-C20 alkenylene group, a substituted or nonsubstituted C1-C20 alkynylene group, a substituted or nonsubstituted C6-C20 arylene group, a substituted or nonsubstituted C2-C20 heteroarylene group, —C(=O)—, or —SO$_2$—.

According to another aspect of the present invention, there is provided an electrolyte membrane including the crosslinked object of the benzoxazine-based compound described above.

According to another aspect of the present invention, there is provided a method of preparing an electrolyte membrane including a crosslinked object of a polybenzoxazine-based compound formed of a polymerized resultant of a first benzoxazine-based monomer represented by Formula 1 below or a second benzoxazine-based monomer represented by Formula 2 below with a crosslinkable compound, the method including: mixing the first benzoxazine-based monomer of Formula 1 or the second benzoxazine-based monomer of Formula 2 with the crosslinkable compound; and curing the resultant mixture, and then impregnating the resultant with a proton conductor:

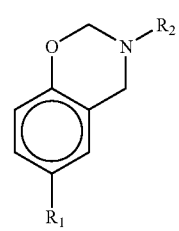

(1)

wherein R$^1$ is hydrogen, a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C2-C20 heteroaryl group, a substituted or nonsubstituted C4-C20 cycloalkyl group or a substituted or nonsubstituted C2-C20 heterocyclic group, a halogen atom, a hydroxyl group, or a cyano group; and R$_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group;

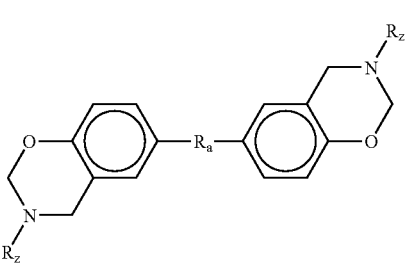

(2)

wherein, $R_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group; and $R_3$ is a substituted or nonsubstituted C1-C20 alkylene group, a substituted or nonsubstituted C1-C20 alkenylene group, a substituted or nonsubstituted C1-C20 alkynylene group, a substituted or nonsubstituted C6-C20 arylene group, a substituted or nonsubstituted C2-C20 heteroarylene group, —C(=O)—, or —SO$_2$—.

According to another aspect of the present invention, there is provided a method of preparing an electrolyte membrane including a crosslinked object of a polybenzoxazine-based compound formed of a polymerized resultant product of a first benzoxazine-based monomer represented by Formula 1 below or a second benzoxazine-based monomer represented by Formula 2 below with a crosslinkable compound, the method including: mixing the first benzoxazine-based monomer of Formula 1 or the second benzoxazine-based monomer of Formula 2 with the crosslinkable compound; and forming a membrane on a supporter using the resultant mixture, then curing the resultant, and then impregnating the cured resultant with a proton conductor:

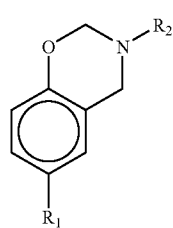

(1)

wherein $R^1$ is hydrogen, a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C2-C20 heteroaryl group, a substituted or nonsubstituted C4-C20 cycloalkyl group or a substituted or nonsubstituted C2-C20 heterocyclic group, a halogen atom, a hydroxyl group, or a cyano group; and $R_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group;

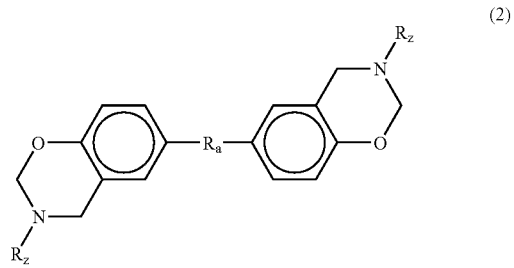

(2)

wherein, $R_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group; and $R_3$ is a substituted or nonsubstituted C1-C20 alkylene group, a substituted or nonsubstituted C1-C20 alkenylene group, a substituted or nonsubstituted C1-C20 alkynylene group, a substituted or nonsubstituted C6-C20 arylene group, a substituted or nonsubstituted C2-C20 heteroarylene group, —C(=O)—, or —SO$_2$—.

While not required in all aspects, the forming of the membrane may be performed by tape casting the resultant mixture on the supporter. Altenatively, the forming of the membrane is performed by casting the resultant mixture on the supporter.

While not required in all aspects, the method may further include detaching the cured resultant from the supporter to remove the supporter.

While not required in all aspects, the proton conductor may be at least one of phosphoric acid and C1-C10 alkyl phosphoric acid; and an amount of the proton conductor is in a range of 100 to 1,000 parts by weight based on 100 parts by weight of the crosslinked object of the polybenzoxazine-based compound.

According to another aspect of the present invention, there is provided a fuel cell employing an electrolyte membrane, including any of the various crosslinked objects of the polybenzoxazine-based compound described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
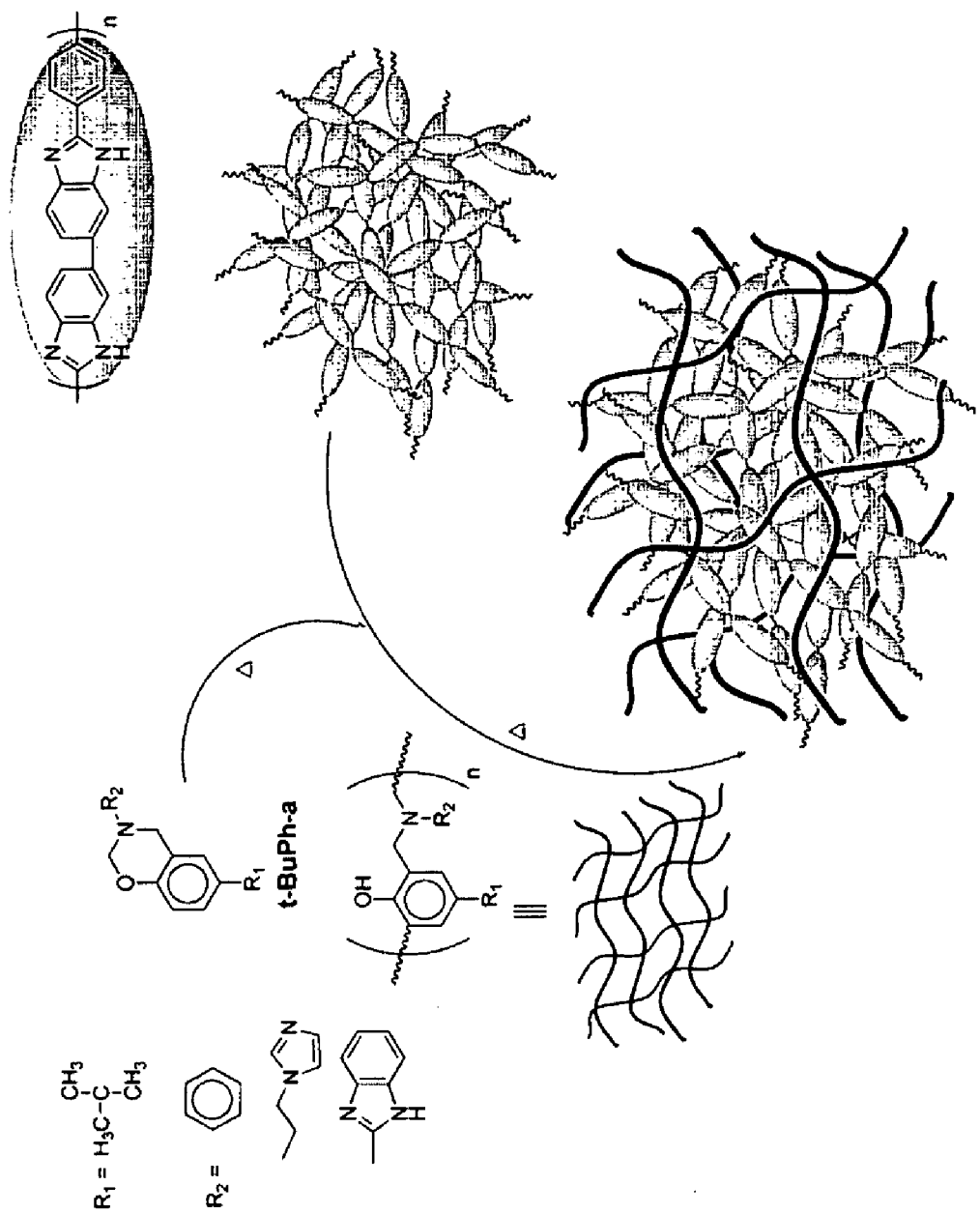
FIGS. 1A and 1B are drawings illustrating curing reactions of benzoxazine-based monomers and polybenzimidazole according to embodiments of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

According to an embodiment of the present invention, an electrolyte membrane is provided, having excellent mechanical and chemical stability even when the amount of impregnated proton carrier, such as a phosphoric acid, etc., is at a maximum capacity or greater, by preparing the electrolyte membrane using a crosslinked object of a polybenzoxazine-based compound formed by polymerizing a first benzoxazine-based monomer of Formula 1 below or a second, multifunctional, benzoxazine-based monomer of Formula 2 below with a crosslinkable compound:

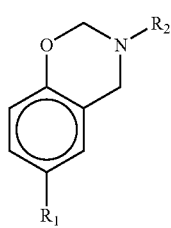
(1)

wherein $R_1$ is hydrogen, a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C2-C20 heteroaryl group, a substituted or nonsubstituted C4-C20 cycloalkyl group or a substituted or nonsubstituted C2-C20 heterocyclic group, a halogen atom, a hydroxyl group, or a cyano group; and $R_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group;

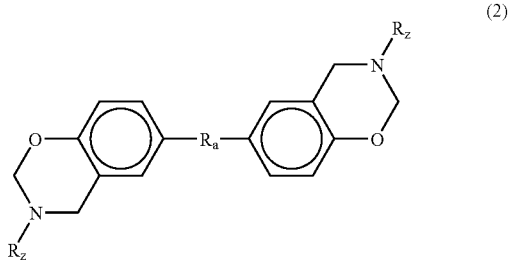
(2)

wherein, $R_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group; and $R_3$ is a substituted or nonsubstituted C1-C20 alkylene group, a substituted or nonsubstituted C1-C20 alkenylene group, a substituted or nonsubstituted C1-C20 alkynylene group, a substituted or nonsubstituted C6-C20 arylene group, a substituted or nonsubstituted C2-C20 heteroarylene group, —C(=O)—, or —SO$_2$—.

According to another embodiment of the present invention, an electrolyte membrane is provided, having excellent mechanical and chemical stability even when the amount of impregnated proton carrier, such as a phosphoric acid, etc., is at a maximum capacity or greater, by preparing the electrolyte membrane using a crosslinked object of a polybenzoxazine-based compound formed by polymerizing a first benzoxazine-based monomer of Formula 1 above or a second, multifunctional, benzoxazine-based monomer of Formula 2 above.

$R^1$ of Formula 1 above may preferably be a tertiarybutyl group. $R_2$ of Formulas 1 and 2 may be a phenyl group, —CH$_2$—CH=CH$_2$,

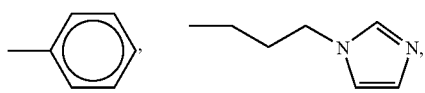

-continued

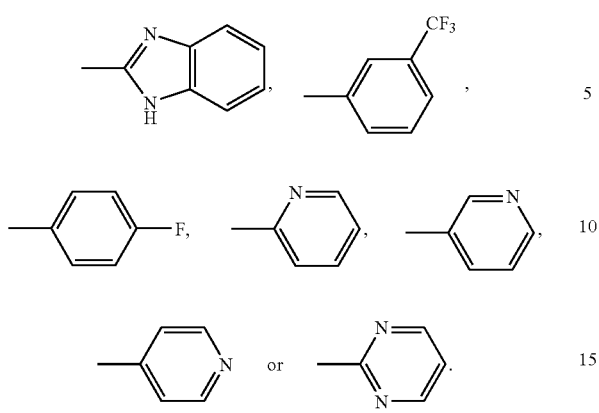

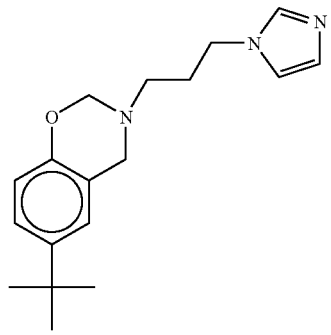

When $R_3$ of Formula 2 is —C(CH$_3$)$_2$—, —C(CF$_3$)$_2$—, —C(=O)—, —SO$_2$—, —CH$_2$—, —C(CCl$_3$)—, —CH(CH$_3$)—, or —CH(CF$_3$)—, Formula 2 is a difunctional benzoxazine-based compound containing 2 benzoxazine rings. When $R_3$ of Formula 2 is a group represented by the formula below, Formula 2 is a trifunctional benzoxazine-based compound containing 3 benzoxazine rings:

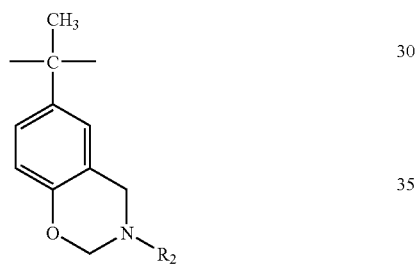

The first benzoxazine-based monomer of Formula 1, for example, may be a compound represented by Formulas 3 through 12:

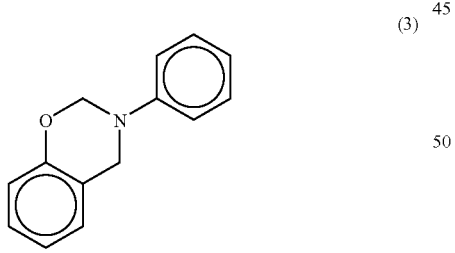
(3)

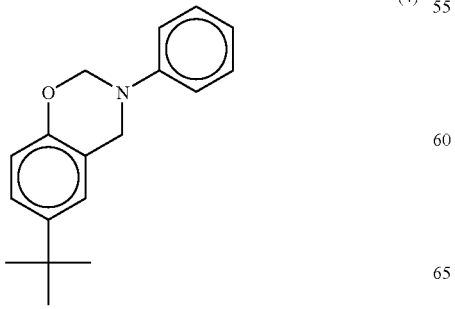
(4)

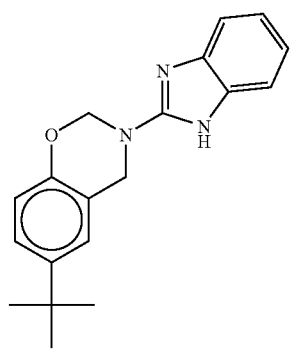
(5)

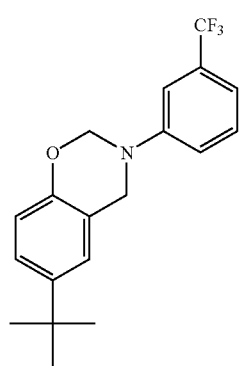
(6)

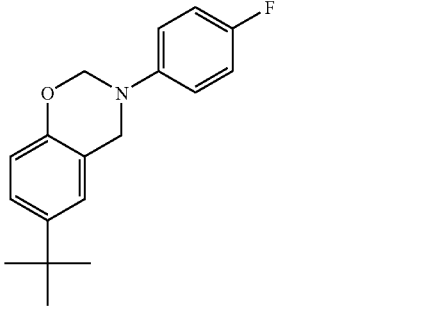
(7)

(8)

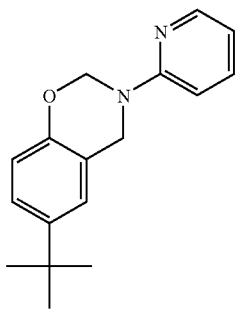
(9)
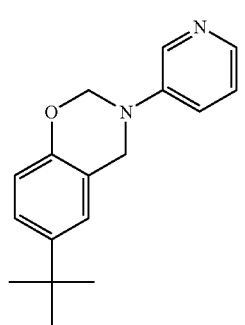
(10)
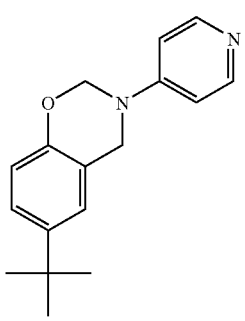
(11)
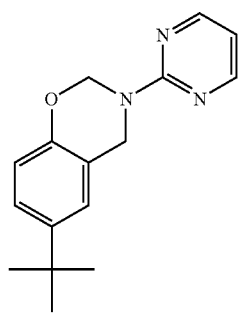
(12)
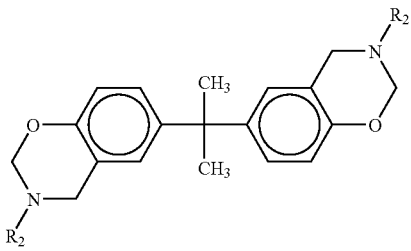
(13)
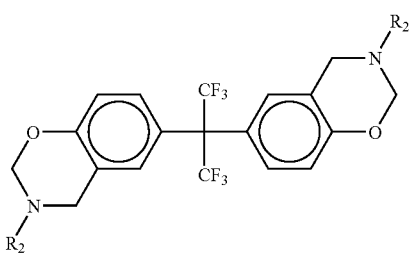
(14)
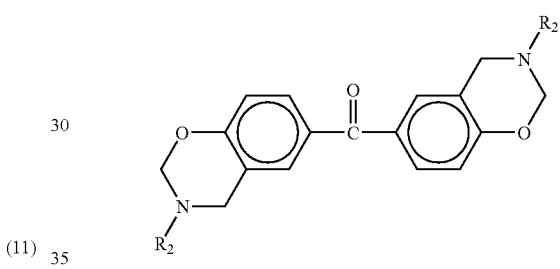
(15)
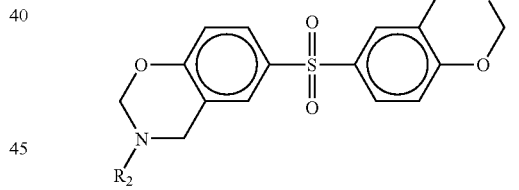
(16)
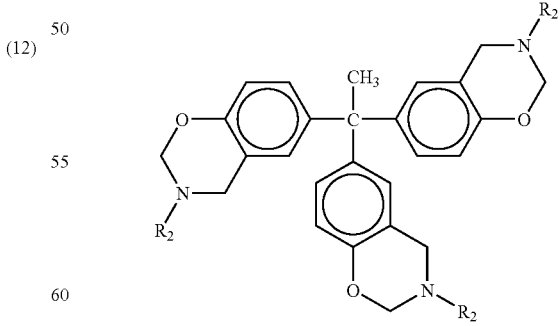
(17)
The second benzoxazine-based monomer of Formula 2, for example, may be a compound represented by Formulas 13 through 17:
wherein, $R_3$ is —C(CH$_3$)$_2$—, —C(CF$_3$)$_2$—, —C(=)—, —SO$_2$—, —CH$_2$—, —C(CCl$_3$)—, —CH(CH$_3$)—, —CH(CF$_3$)—, or

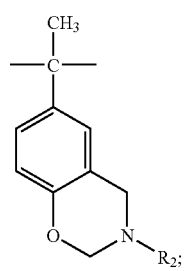

and R₂ is a phenyl group, —CH₂—CH=CH₂,

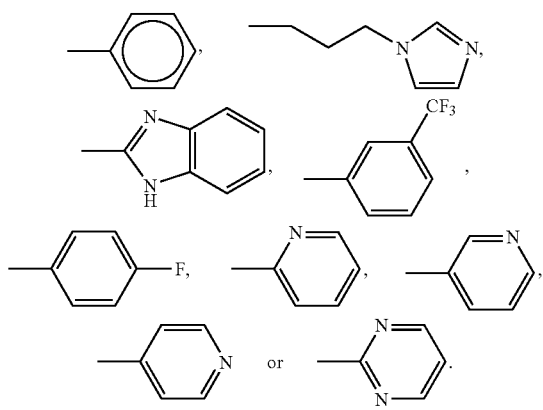

The crosslinkable compound according to the current embodiment of the present invention may be any compound that is crosslinkable with the benzoxazine-based monomer. The crosslinkable compound, for example, may include at least one selected from the group consisting of polybenzimidazole, polybenzthiazole, polybenzoxazole, and polyimide, but is not limited thereto.

A process of synthesizing the crosslinked object of the polybenzoxazine-based compound, which is the polymerized resultant product of the first benzoxazine-based monomer of Formula 1 above or the second benzoxazine-based monomer of Formula 2 above with the crosslinkable compound, will now be described.

The first benzoxazine-based monomer of Formula 1 above or the second benzoxazine-based monomer of Formula 2 above is mixed with the crosslinkable compound in a prescribed mixing ratio. Here, an amount of the crosslinkable compound may be in a range of 5 to 95 parts by weight based on 100 parts by weight of the first benzoxazine-based monomer of Formula 1 or the second benzoxazine-based monomer of Formula 2.

Generally, when the amount of the crosslinkable compound is less than 5 parts by weight, phosphoric acid cannot be impregnated thereby decreasing proton conductivity. Generally, when the amount of the crosslinkable compound is greater than 95 parts by weight, the crosslinked object is dissolved in polyphosphoric acid, thereby allowing gas penetration.

Figure 1B:
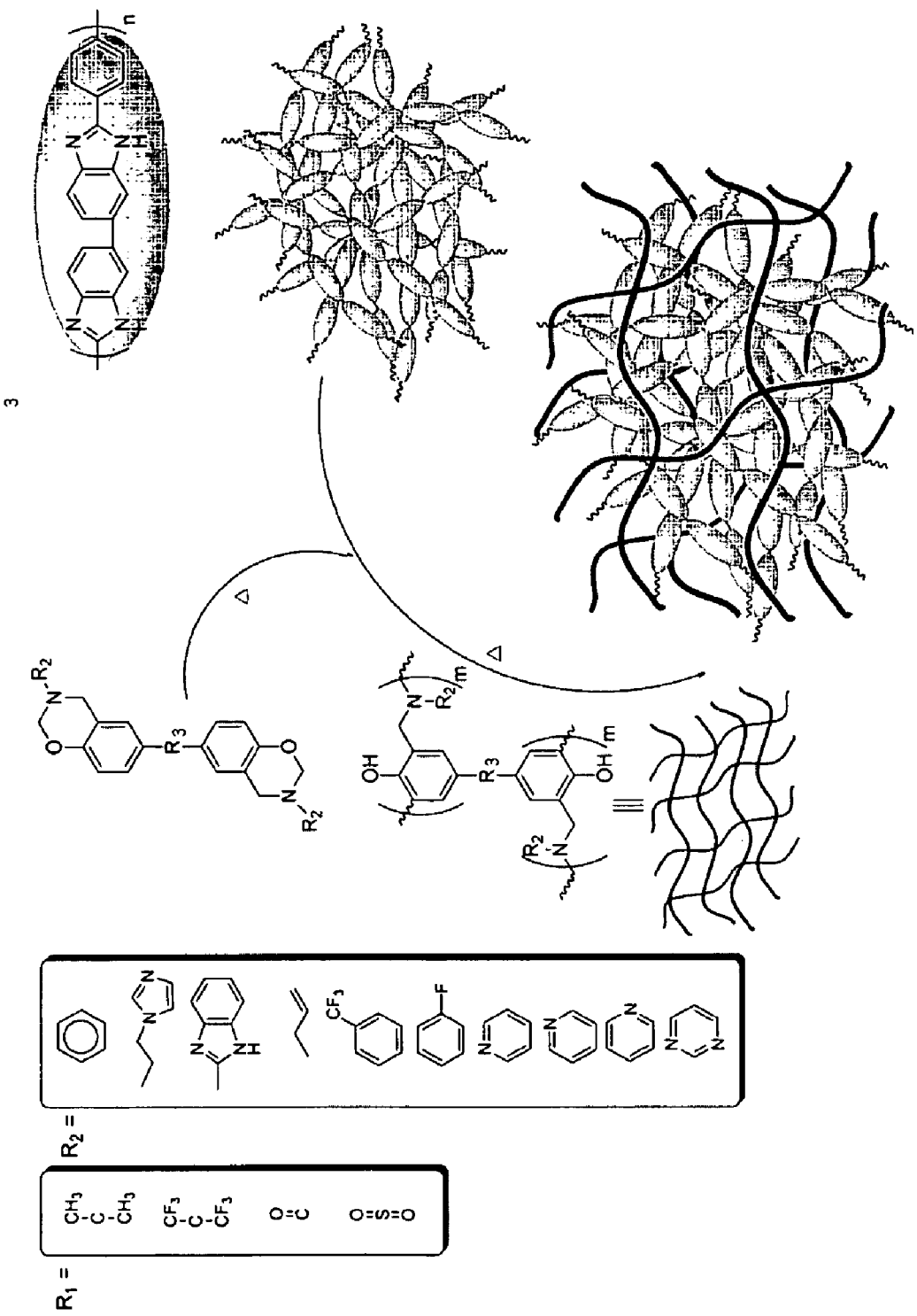

When the resultant mixture is cured, the crosslinked object of the polybenzoxazine-based compound can be obtained through an intercrosslinking reaction as shown in FIG. 1A or FIG. 1B. In other words, through the intercrosslinking reaction of the resultant mixture, the crosslinked object of the polybenzoxazine-based compound can be obtained. That is, the first or second benzoxazine-based monomer is polymerized (cured) with the crosslinkable compound, such as polybenzimidazole, using a thermal ring opening polymerization process to form a polymer matrix. The thermal ring opening polymerization process is performed by regulating temperature gradually. Generally the reaction time should be at least 1 hour, so that the polymer matrix has developed a network structure.

Figure 1C:
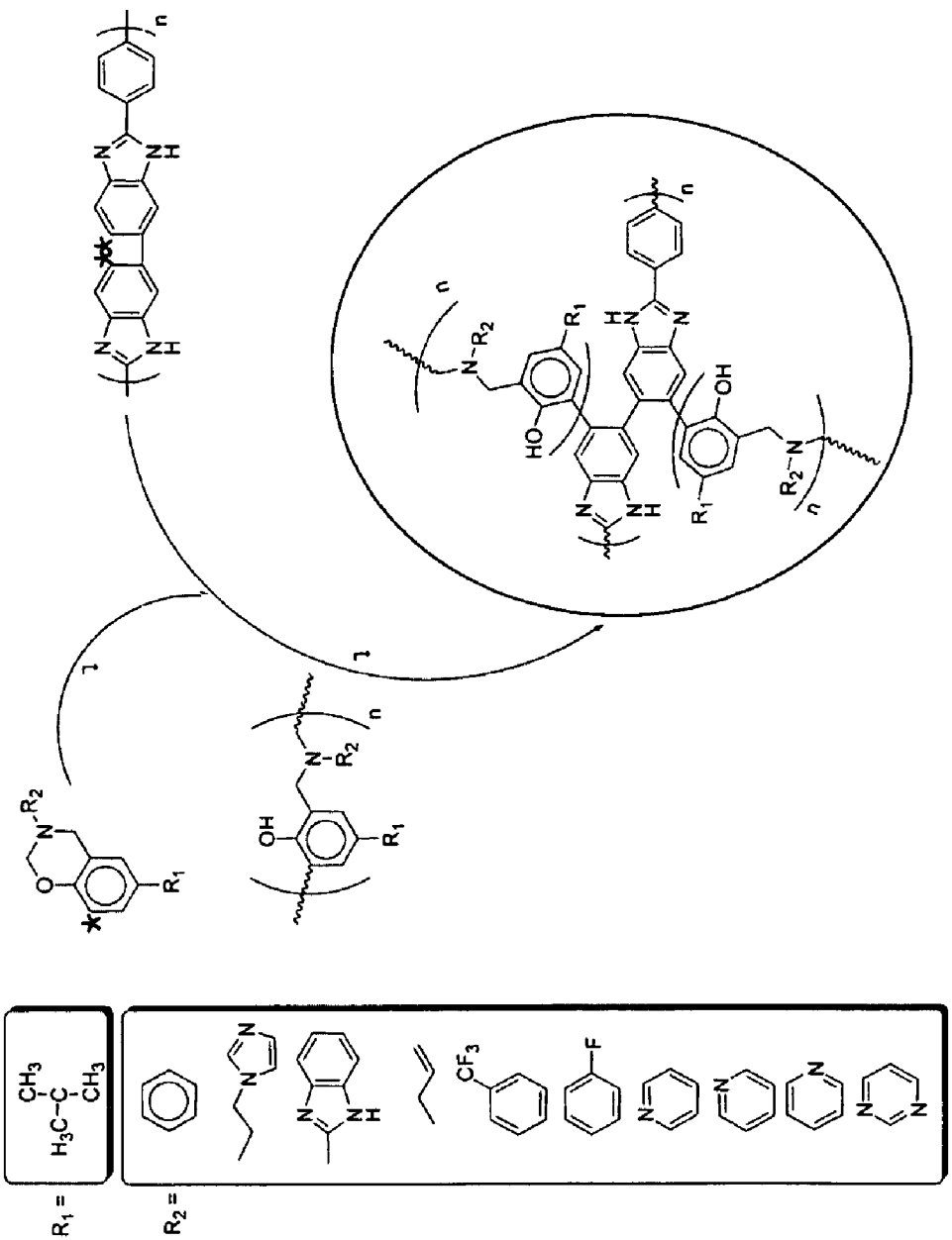
FIGS. 1C and 1D are drawings illustrating reaction mechanisms of benzoxazine-based monomers and polybenzimidazole according to other embodiments of the present invention.
Figure 1D:
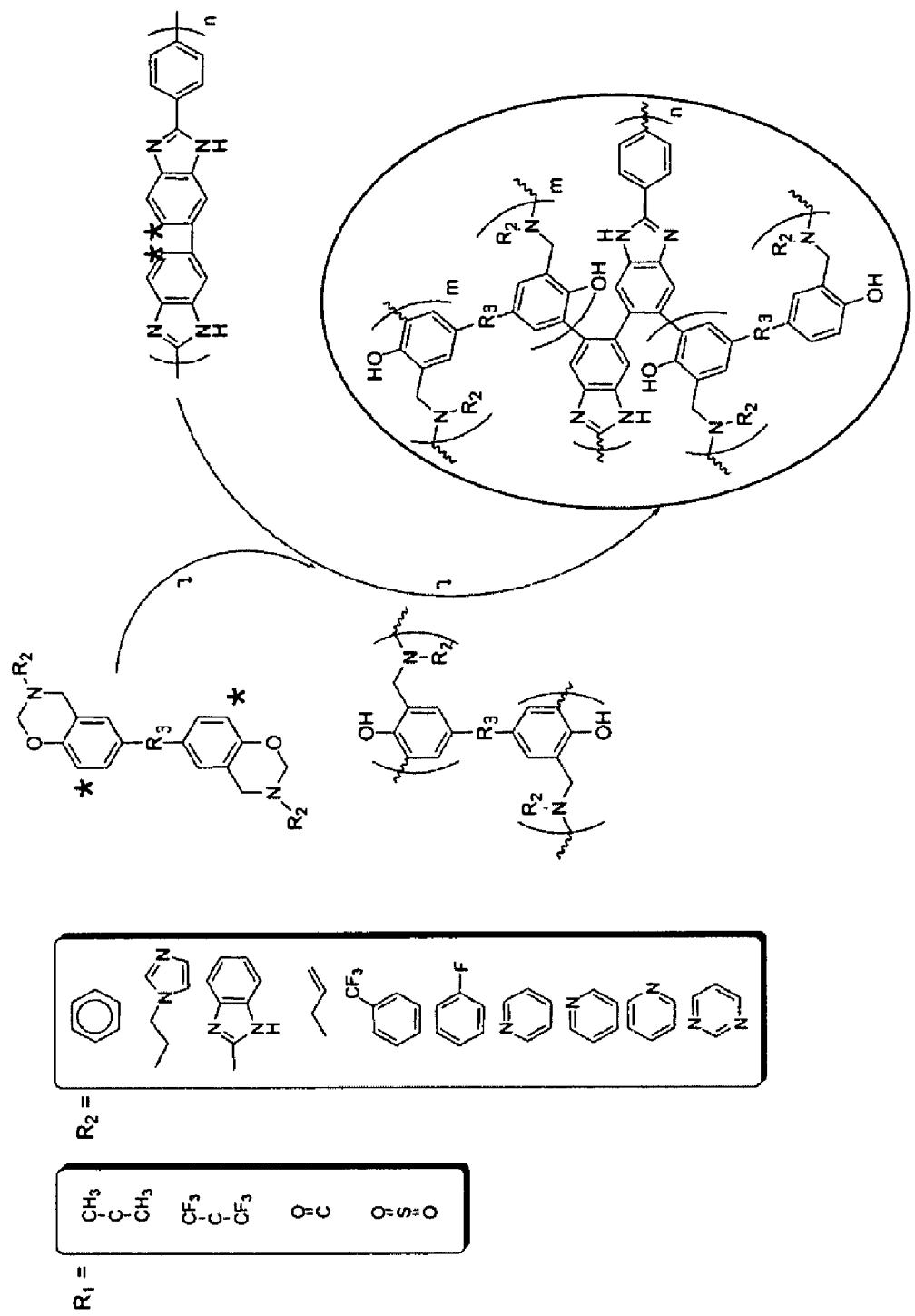

FIGS. 1C and 1D are drawings to describe reaction mechanisms of the first benzoxazine-based monomer and polybenzimidazole; and the second benzoxazine-based monomer and polybenzimidazole respectively according to other embodiments of the present invention.

Referring to FIGS. 1C and 1D, oxazine rings of the first and second benzoxazine-based monomers open due to heat and then the resultant combines with the ortho-sites of phenyl rings of polybenzimidazole (n is a number in the range of 100 to 10,000). Accordingly, intercrosslinking reactions having the same growing directions as in FIGS. 1C and 1D take place.

The curing reaction temperature may differ according to the type, etc., of the first benzoxazine-based monomer, the second benzoxazine-based monomer, and the crosslinkable compound, but may be in a range of 50 to 250° C. Generally, when the curing reaction temperature is lower than 50° C., a curing reaction cannot take place. Generally, when the curing reaction temperature is higher than 250° C., undesirable side reaction substances are obtained.

The curing reaction time depends on the curing reaction temperature, and may be at least 1 hour in the above temperature range. Specifically, the curing reaction time may be in the range of 8 to 20 hours.

The chemical and physical properties of the crosslinked object of the polybenzoxazine-based compound, which is the polymerized resultant of the first benzoxazine-based monomer of Formula 1 or the second benzoxazine-based monomer of Formula 2 and the crosslinkable compound will now be described.

The crosslinked object of the polybenzoxazine-based compound according to aspects of the present invention has thermosetting properties, and so the crosslinked object does not dissolve in any organic solvent, an acid, or a base. Accordingly, molecular weight cannot be measured using Gel Permeation Chromatography (GPC), which is a conventional method of obtaining information on molecular weight of a polymer.

The crosslinked object of the polybenzoxazine-based compound generated from the first or second benzoxazine monomer via polymerization is a thermosetting resin as described above. Accordingly, once the polymerization is performed, the crosslinked object is not soluble in any organic solvents. Moreover, the crosslinked object does not have a glass transition temperature like other polymers. Thus, the crosslinked object cannot be analyzed using a conventional method. Also, even when a thermosetting resin forms a copolymer with a thermoplastic resin, the overall properties of the copolymer will be similar to the thermosetting resin. Thus, it is impossible to prove copolymer formation between the first or second benzoxazine-based monomer and the polybenzimidazole using a conventional method. Accordingly, to prove the copolymer formation, an experiment described below was performed.

As described above, the product of the polymerization reaction of a thermosetting resin has a solubility problem and thus it cannot be analyzed. Thus, the initial product of the polymerization reaction is analyzed to check the bond forming between the first or second benzoxazine-based monomer and the polybenzimidazole. That is, to check the bond forming, a very small portion of the first or second benzoxazine-based monomer is combined with the polybenzimidazole during the initial polymerization. When the overall polymeric properties of the polybenzimidazole are not changed, it is deemed that the first or second benzoxazine-based monomer and the polybenzimidazole formed a copolymer.

Figures 16A, 16B, 16C:
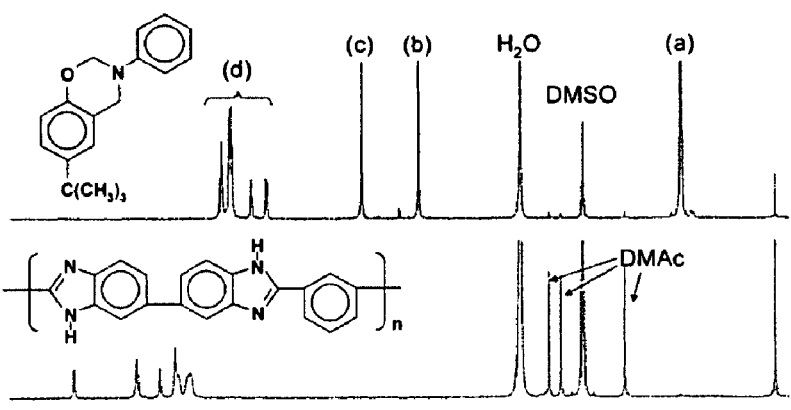
FIGS. 16A, 16B and 16C are nuclear magnetic resonance (NMR) spectra, respectively, of a benzoxazine monomer, polybenzimidazole, and a crosslinked object of a polybenzoxazine-based compound according to an embodiment of the present invention.

FIGS. 16A, 16B and 16C show, respectively, nuclear magnetic resonance (NMR) spectra of the benzoxazine-based monomer, the polybenzimidazole, and the crosslinked object of a polybenzoxazine-based compound prepared by mixing the first benzoxazine-based monomer and the polybenzimidazole in a predetermined ratio, and then heating the resultant mixture at 100° C. for 30 min. As shown in FIGS. 16A and 16B, the first benzoxazine-based monomer and the polybenzimidazole are confirmed by the position of the peaks of each component except the peaks corresponding to solvents. That is, (a) to (d) of FIG. 16A, denoting proton peaks of the first benzoxazine-based monomer, are in different positions from FIG. 16B, illustrating the NMR spectrum of polybenzimidazole. Thus, the existence of the first benzoxazine-based monomer and the polybenzimidazole can be confirmed even when they are mixed in FIG. 16C.

Specifically, (a) in FIG. 16A is a peak of (—C(CH$_3$)$_3$) of a tertiary-butyl group combined with a phenyl group of (t-BuPh-a) of the benzoxazine-based monomer according to the current embodiment of the present invention. Even a small amount of (—C(CH$_3$)$_3$) can be detected because the (—C(CH$_3$)$_3$) has an integrated value corresponding to 9 hydrogen atoms. Consequently, this peak has been used in analyzing the combination of the first benzoxazine-based monomer with polybenzimidazole.

A Diffusion-Ordered NMR Spectroscopy (DOSY-NMR) is a recent NMR measurement method which can classify the spectrum of each component by the difference (or diffusion coefficient) of a hydrodynamic volume of components dissolved in a solution. Using the DOSY-NMR, a polymer compound can easily be analyzed, because the DOSY-NMR can classify solutions in the polymer compound without specific pretreatment. (References: B. Antalek, Concepts in Magnetic Resonance, 14(4), 225-258 (2002); S. Viel, D. Capitani, L. Mannina, A. Segre, Biomacromolecules, 4, 1843-1847 (2003); D. A. Jayawickrama, C. K. Larive, E. F. Macord, D. C. Roe, Magn. Reson. Chem., 36, 755-760 (1998); K. Nishinari, K. Kohyama, P. A. Williams, G. O. Phillips, W. Burchard, K. Ogino, Macromolecules, 24, 5590-5593 (1991); C. M. Leon, V. Gorkom, T. M. Hancewicz, J. Magn. Reson., 130,125-130 (1998); and A. Chen, D. Wu, C. S. Johnson, Jr., J. Am. Chem. Soc. 117, 7965-7970 (1995)).

Figure 17:
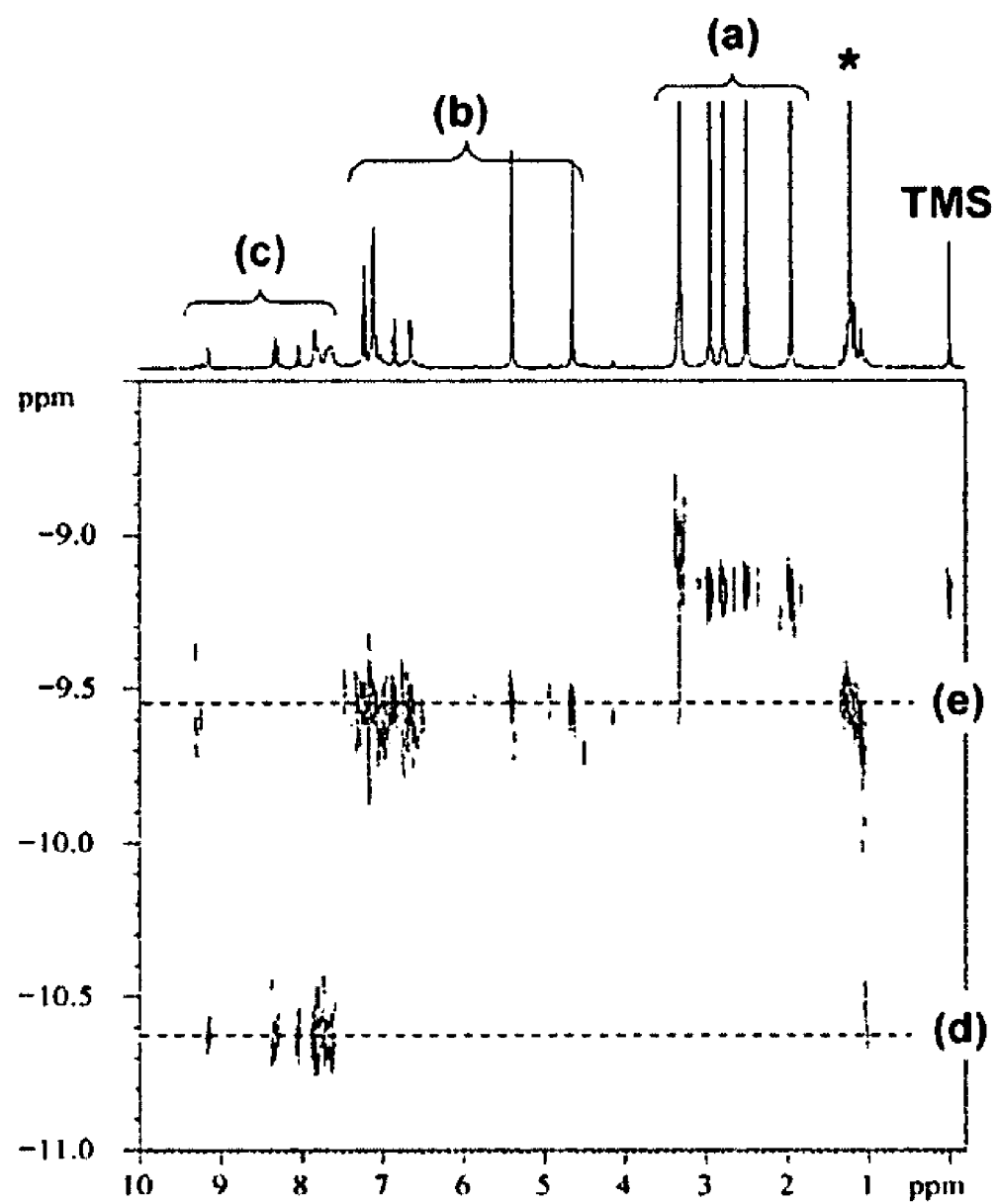
FIG. 17 is a Diffusion-Ordered NMR Spectroscopy (DOSY-NMR) spectrum of a mixture of benzoxazine and polybenzimidazole.

The formation of the benzoxazine-polybenzimidazole (benzoxazine-PBI) copolymer according to the current embodiment of the present invention was confirmed using the DOSY-NMR. FIG. 17 is a DOSY-NMR spectrum of the mixture of benzoxazine and polybenzimidazole during the initial polymerization reaction. Similar-sized molecules or molecules connected to each other by a combination reaction appear on an identical line of a Y-axis of an NMR spectrum, based on the well accepted theory of the DOSY-NMR. As shown in FIG. 17, the peaks represented by (a), are set by solvents, such as water, DMSO, DMAc, etc., which have very small molecular sizes. Accordingly, these peaks have values of between −9.0 to −9.2 on the Y-axis. The first benzoxazine-based monomers before the reaction, represented by (b) in FIG. 17, are on a same line (e) between about −9.5 to −9.6. Accordingly, using the DOSY-NMR, the types and sizes of the molecules can be classified through the peaks on the one-dimensional NMR spectrum shown in FIGS. 16A, 16B and 16C.

On the one hand, (c), which are the peaks resulting from the polybenzimidazole (PBI), are on about −10.6 which is much smaller than the −9.5 to −9.6 value of the first benzoxazine-based monomer. However, based on the DOSY-NMR principle, a value on the Y-axis corresponds to the diffusion coefficient, and as the molecular size increases, the value on the Y-axis increases in the negative direction. Accordingly, the polybenzimidazole, which is a polymer, has a bigger negative value than the benzoxazine before the reaction, which is a single molecule. The proton peak corresponding to the tert-butyl group (marked by an asterisk) of the benzoxazine-based monomer is on the same line as the polybenzimidazole (dotted d line). This shows that the benzoxazine and the polybenzimidazole combine together to form the copolymer according to the current embodiment of the present invention.

Figure 18:
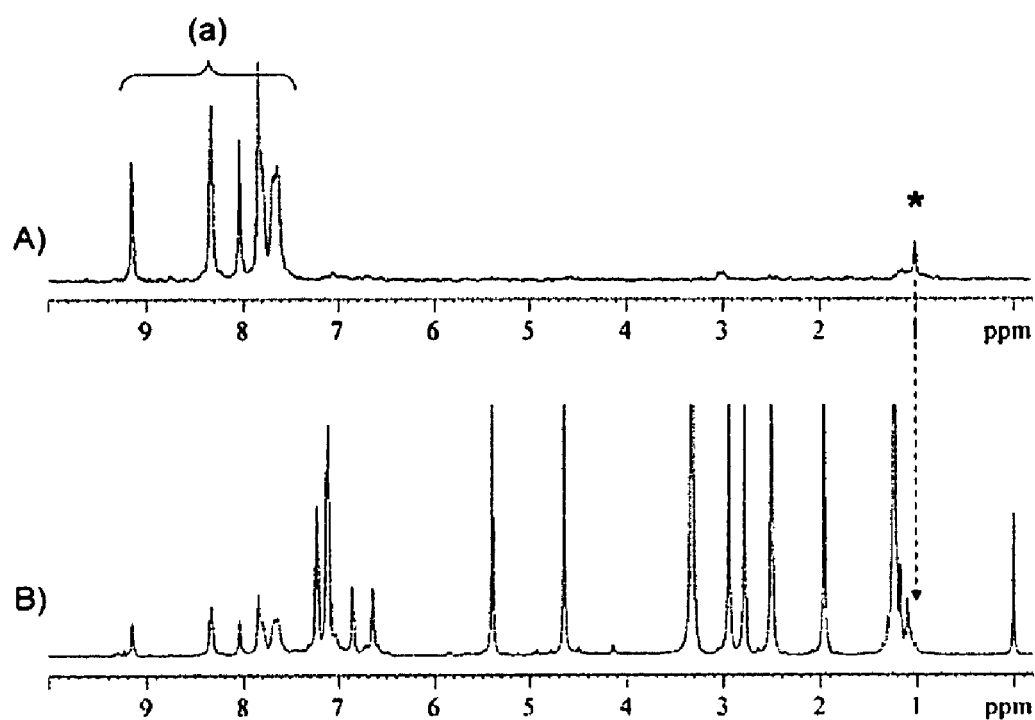
FIG. 18 is an NMR spectrum of a heat-treated mixture of benzoxazine-polybenzimidazole.

FIG. 18 shows a comparison of a proton-nuclear magnetic resonance ($^1$H-NMR) spectrum obtained using a pulsed field gradient (PFG) technique with a gradient strength of 98% and a spectrum from a normal technique of the heat-treated mixture of benzoxazine-PBI to reconfirm the DOSY-NMR spectrum results. Since the peaks set by molecules smaller than the polybenzimidazole molecules disappear, peaks corresponding to the first benzoxazine-based monomer and the solvent are not shown in (A) of FIG. 18. However, the proton peak corresponding to the tertbutyl group (marked by an asterisk) can still be confirmed, with the peaks corresponding to the polybenzimidazole (marked in (a)) in (A) of FIG. 18, although they are very small. Compared to (B) of FIG. 18, the tertbutyl group shown in (A) of FIG. 18 is not only formed during the initial reaction with a discernible amount in (B) of FIG. 18, but also shifted to an upper field by 0.2 ppm due to reaction with polybenzimidazole. Such a chemical shift in an NMR spectrum is a typical phenomenon which occurs during a chemical reaction. Also, this phenomenon cannot take place with the benzoxazine-based monomer only existing around the polybenzimidazole. Consequently, polybenzoxazine-co-polybenzimidazole (PBOA-co-PBI), which is a copolymer of benzoxazine and polybenzimidazole is confirmed using the method described above.

Figure 9:
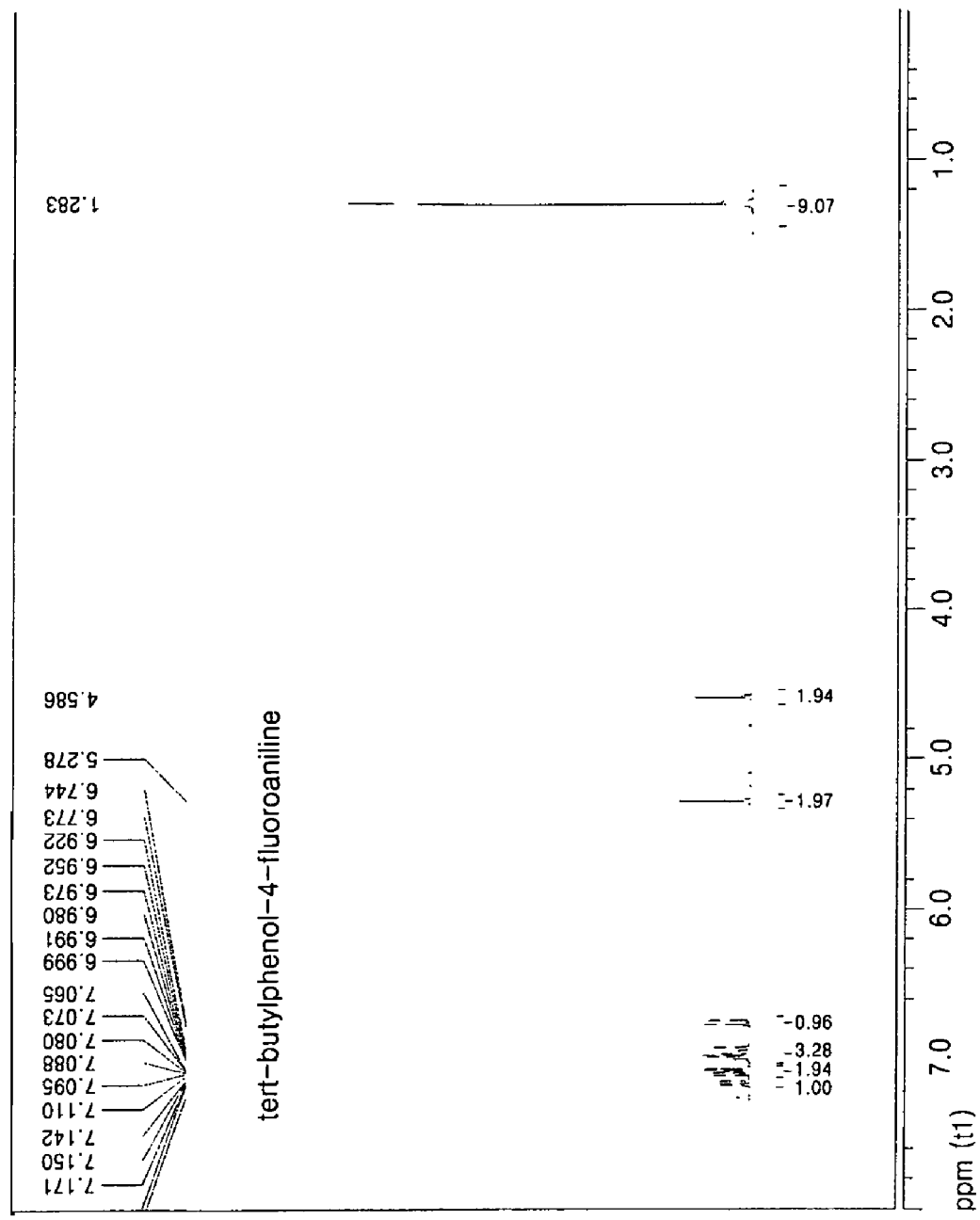
FIGS. 9 through 11 are graphs showing $^1$H-NMR data of polybenzoxazine monomers according to embodiments of the present invention.
Figure 10:
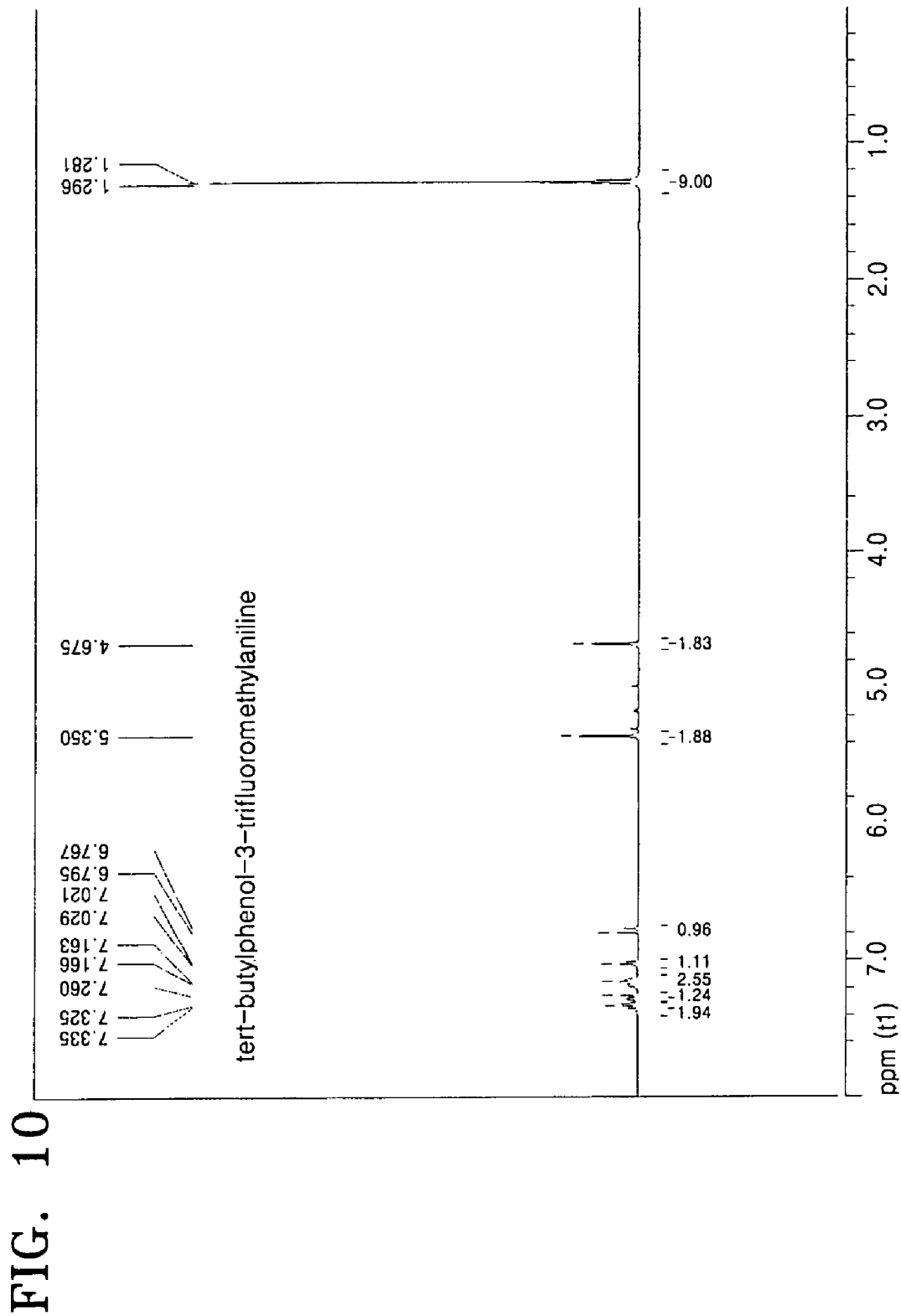
Figure 11:
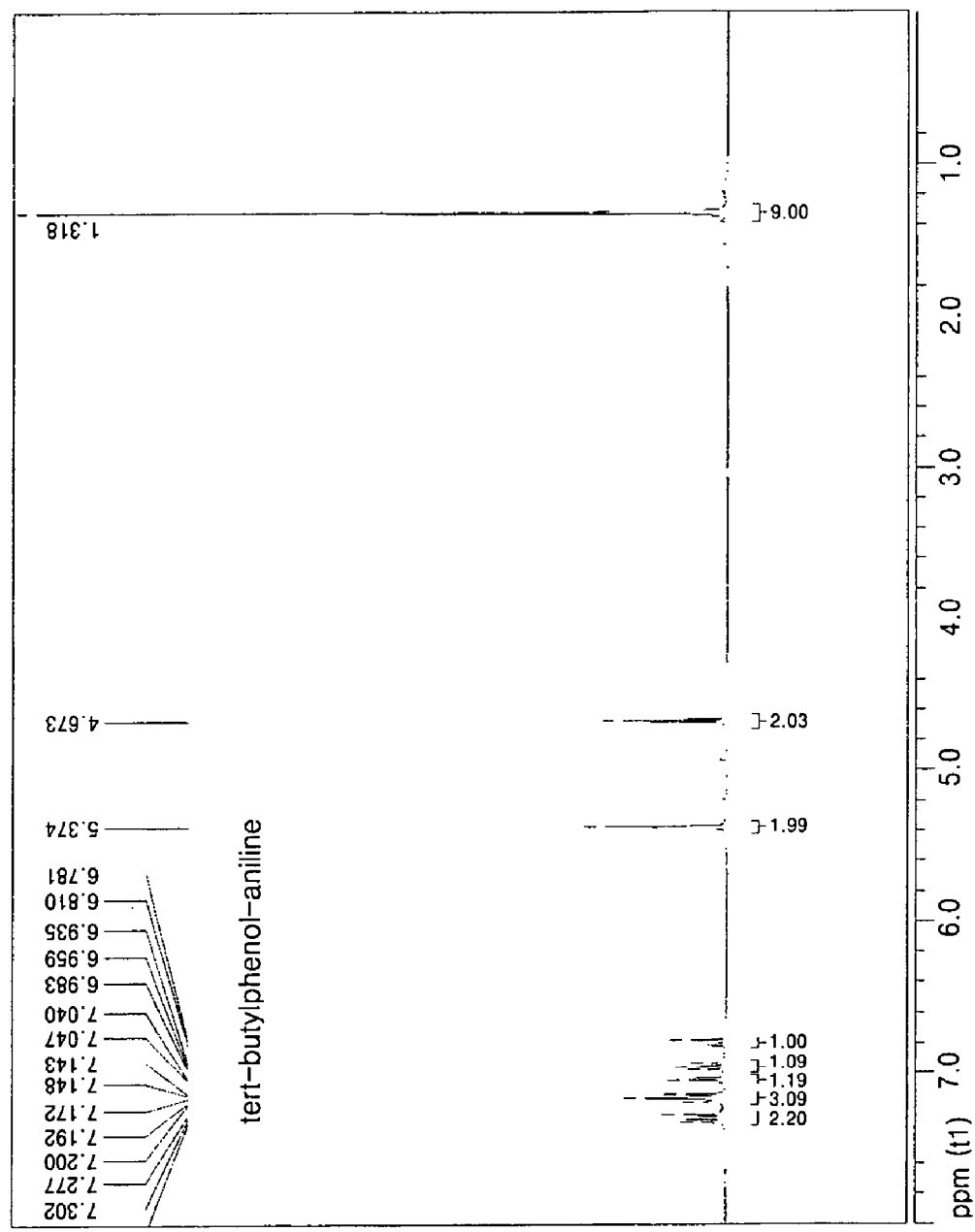

FIGS. 9 through 11 are graphs showing $^1$H-NMR data of the first benzoxazine monomers according to the current embodiment of the present invention.

The polymerized resultant described above can be used in an electrolyte membrane of a fuel cell. There are various methods of preparing the electrolyte membrane according to embodiments of the present invention, two such methods will be described. Here, polybenzimidazole is used as a crosslinkable compound.

According to the first method, the first benzoxazine-based monomer of Formula 1 above or the second benzoxazine-based monomer of Formula 2 above is blended with the crosslinkable compound, such as polybenzimidazole. The resultant is cured at 50 to 250° C., preferably 80 to 220° C. Then a proton conductor, such as an acid, is impregnated in the cured resultant to form an electrolyte membrane.

According to the second method, the first benzoxazine-based monomer of Formula 1 above or the second benzoxazine-based monomer of Formula 2 above is mixed with the crosslinkable compound, such as polybenzimidazole, and the resultant mixture is used to form a membrane on a supporter. Then the resultant is cured, and impregnated with a proton conductor. The membrane can be formed using a tape casting method or a conventional coating method. The conventional coating method, for example, may be performed by casting the resultant mixture on a supporter using a doctor blade. Here, the doctor blade may have a 250 to 500 μm gap.

When the casting method using the doctor blade is used during the forming of the membrane, separating the membrane from the supporter after the curing of the resultant, and before the impregnating of the cured resultant may further be performed. The separating of the membrane may be performed at 60 to 80° C. in distilled water.

Any supporter may be used which can support the electrolyte membrane. Examples of the supporter include a glass substrate, a polyimide film, etc. When the tape casting method is used, the membrane is separated from the supporter, such as polyethylene terephthalate, before the curing of the resultant, and then the membrane is put into an oven for curing. Accordingly, removing of the supporter is not required. Also, when the tape casting method is used, the resultant mixture may be filtered. Accordingly, the resultant is cured by heat treatment, and then the cured resultant is impregnated with the proton conductor, such as an acid, to form the electrolyte membrane.

The proton conductor, for example, may be phosphoric acid, C1-C10 alkylphosphoric acid, or the like, but is not limited thereto. Examples of C1-C10 alkylphosphoric acid include ethylphosphoric acid, etc.

An amount of the proton conductor may be in a range of 300 to 1,000 parts by weight based on 100 parts by weight of the electrolyte membrane. The density of the proton conductor is not specifically limited, but when phosphoric acid is used, an 85 wt % aqueous phosphoric acid solution is preferably used. The impregnation time in phosphoric acid may be 2.5 to 14 hours at 80° C.

When only the first or second benzoxazine-based monomer is used in preparing the electrolyte membrane, the same conditions as above are applied, except that the crosslinkable compound, such as polybenzimidazole, is not used.

The electrolyte membrane can be used as a hydrogen ion conducting membrane of a fuel cell. A method of manufacturing a membrane electrode assembly (MEA) using such a hydrogen ion conducting membrane is as follows. The term "MEA" used herein refers to a structure in which electrodes including a catalyst layer and a diffusion layer are laminated on both sides of an electrolyte membrane.

In the MEA, an electrode having a catalyst layer is disposed on each side of the electrolyte membrane according to an embodiment of the present invention. Then the MEA can be formed by binding the electrodes to the electrolyte membrane at a high temperature and high pressure. Alternatively, an MEA can be formed by coating a metal catalyst which causes an electrochemical catalyst reaction on each side of the electrolyte membrane and binding a fuel diffusion layer to the metal catalyst. In either instance, the temperature for the binding may be sufficient to soften the electrolytic membrane, and the pressure may be 0.1 to 3 ton/cm², for example, 1 ton/cm².

To manufacture a fuel cell, a bipolar plate is attached to the MEA. The bipolar plate has grooves for supplying fuel, and functions as a collector. While preparing the MEA, the catalyst may be platinum alone, or an alloy or a mixture of platinum and at least one metal selected from the group of metals consisting of gold, palladium, rhodium, iridium, ruthenium, tin, molybdenum, cobalt, nickel, and chrome. The fuel cell is not specifically limited in use, but is preferably used as a polymer electrolyte membrane fuel cell (PEMFC).

The preparation process of the first benzoxazine-based monomer of Formula 1 above will now be described referring to Reaction Scheme 1 below:

[Reaction Scheme 1]

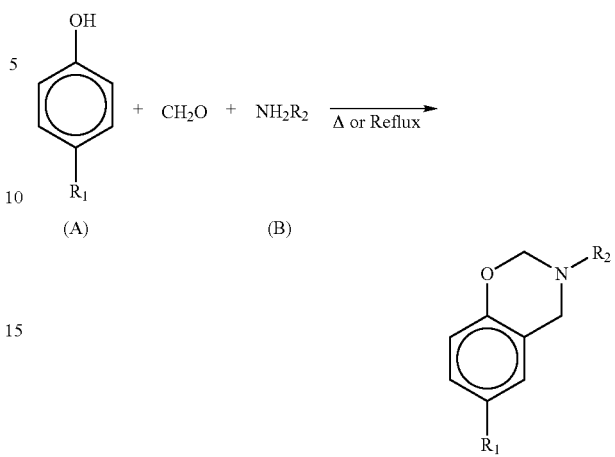

wherein, $R_1$ and $R_2$ are as described above.

$R_1$ of Reaction Scheme 1 may be a tertiary butyl group, and $R_2$ may be a phenyl group, $-CH_2-CH=CH_2$,

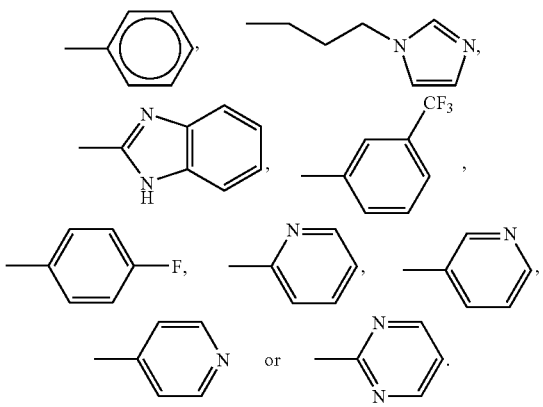

Referring to Reaction Scheme 1, a phenol compound (A), a p-formaldehyde, and an amine derivative (B) are mixed. The mixture is heated without a solvent or refluxed with a solvent. Accordingly, the resultant undergoes a work-up process to obtain the benzoxazine-based monomer of Formula 1.

Examples of the solvent include 1,4-dioxane, chloroform, dichloromethane, toluene, tetrahydrofuran (THF), etc. Also, during the refluxing, the temperature is regulated to between 50 and 90° C., and specifically about 80° C.

A detailed example of the amine derivative (B) is a compound where $R_2$ is represented by one from the group consisting of

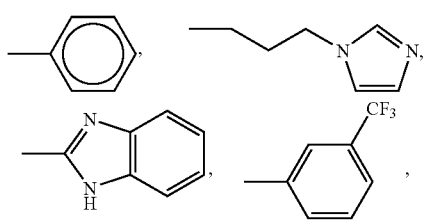

-continued

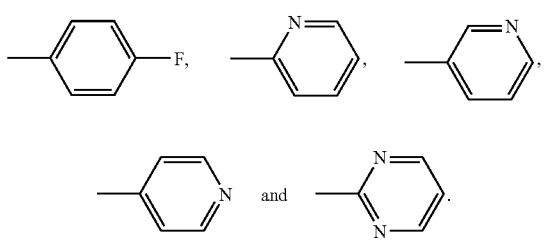

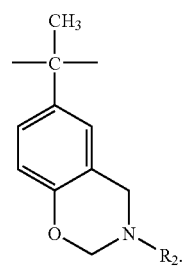

The preparation process of the second benzoxazine-based monomer of Formula 2 above will now be described referring to Reaction Scheme 2 below:

[Reaction Scheme 2]

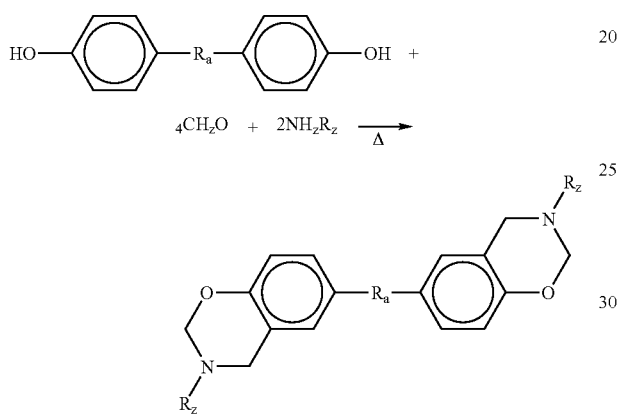

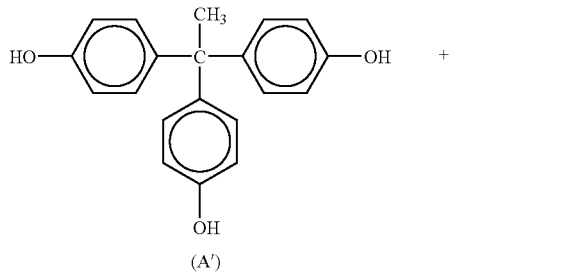

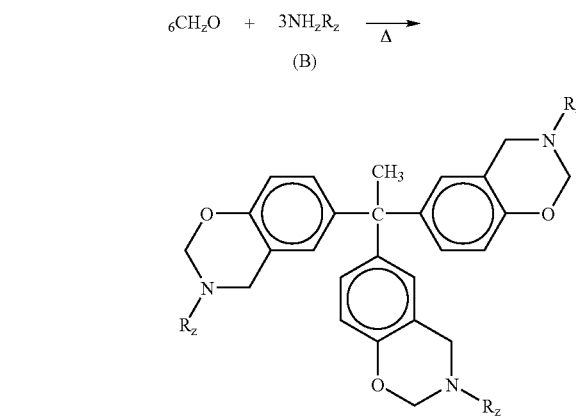

wherein, $R_2$ and $R_3$ are as described above, and specifically, $R_3$ may be —C(CH$_3$)$_2$—, —C(CF$_3$)$_2$—, —C(=O)—, —SO$_2$—, —CH$_2$—, —C(CCl$_3$)—, —CH(CH$_3$)—, —CH(CF$_3$)—, $R_2$ may be a phenyl group, —CH$_2$—CH=CH$_2$, Referring to Reaction Scheme 2, a phenol compound (A'), a p-formaldehyde, and an amine derivative (B) are mixed. The mixture is heated without a solvent or refluxed with a solvent. Accordingly, the resultant undergoes a work-up process to obtain the benzoxazine-based monomer of Formula 2. Examples of the solvent include 1,4-dioxane, chloroform, dichloromethane, toluene, THF, etc. Also, during the refluxing, the temperature is regulated to between 50 and 90° C., and specifically about 80° C. A detailed example of the amine derivative (B) is as described above.

Substituents used in Formulas 1 and 2 will now be described.

Detailed examples of the nonsubstituted C1-C20 alkyl group may be methyl, ethyl, propyl, isobutyl, sec-butyl, pentyl, iso-amyl, hexyl, etc. At least one hydrogen atom in the alkyl can be substituted by a halogen atom, a C1-C20 alkyl group substituted with a halogen atom (for example, CCF$_3$, CHCF$_2$, CH$_2$F, CCl$_3$, or the like), a hydroxyl group, a nitro group, a cyano group, an amino group, an amidino group, a hydrazine, a hydrazone, a carboxyl group or a base thereof, a sulfonic acid group or a base thereof, a phosphoric acid or a base thereof, a C1-C20 alkyl group, a C2-C2-arkenyl group, a C2-C20 arkynyl group, a C1-C20 heteroalkyl group, a C6-C20 aryl, a C6-C20 arylalkyl group, a C6-C20 heteroaryl group, or a C6-C20 heteroarylalkyl group.

Detailed examples of the nonsubstituted C1-C20 alkenyl group include vinylene, allyene, etc. Also, at least one hydrogen atom in the alkenyl can be substituted by the same substituents as the alkyl group above.

Detailed examples of the nonsubstituted C1-C20 alkynyl group include acetylene, etc. Also, at least one hydrogen atom in the alkynyl can be substituted by the same substituents as the alkyl group above.

Detailed examples of the nonsubstituted C1-C20 alkylene group include methylene, ethylene, propylene, isobutylene, sec-butylene, pentylene, iso-amylene, hexylene, etc. Also, at least one hydrogen atom in the alkylene can be substituted by the same substituents as the alkyl group above.

Detailed examples of the nonsubstituted C1-C20 alkenylene group include an aryl group, etc. Also, at least one hydrogen atom in the alkenylene can be substituted by the same substituents as the alkyl group above.

Detailed examples of the nonsubstituted C1-C20 alkynylene group include an acetylene group, etc. Also, at least one hydrogen atom in the alkynylene can be substituted by the same substituents as the alkyl group above.

The aryl group may be used alone or in combination of at least two types, and is a C6-C20 carbocyclic aromatic system including at least one ring. The rings may be adhered or fused together using a pendant method. The aryl group includes an aromatic radical, such as phenyl, naphthyl, and tetrahydronaphthyl. The aryl group may have a substituent, such as haloalkaline, nitro, cyano, alkoxy, and low alkylamino. Also, at least one hydrogen atom in the aryl can be substituted by the same substituents as the alkyl group above.

The arylene group may be used alone or in combination of at least two types, and is a C6-C20 carbocyclic aromatic system including at least one ring. The rings may be adhered or fused together using a pendant method. The arylene group includes an aromatic radical, such as phenylene, naphthylene, and tetrahydronaphthylene. The aryl group may have a substituent, such as haloalkylene, nitro, cyano, alkoxy, and low alkylamino. Also, at least one hydrogen atom in the arylene can be substituted by the same substituents as the alkyl group above.

The arylalkyl group is a substituent where a plurality of hydrogen atoms in the aryl group described above are substituted by radicals, such as low alkyl, methyl, ethyl, and propyl. Examples include benzyl, phenylethyl, etc. Also, at least one hydrogen atom in the arylalkyl can be substituted by the same substituents as the alkyl group above.

The heteroaryl group includes 1, 2, or 3 hetero atoms selected from the group consisting of N, O, P, and S. Also, the heteroaryl group has a monovalent monocyclic structure having 5-30 ring atoms, wherein the rest of the ring atoms are carbon, or a noncyclic aromatic bivalent organic compound. Also, at least one hydrogen atom on the hetero atom can be substituted by the same substituents as the alkyl group above.

The heteroarylene group includes 1, 2, or 3 hetero atoms selected from the group consisting of N, O, P, and S. Also, the heteroarylene group has a monovalent monocyclic structure having 1-20 carbon atoms, wherein the rest of the ring atoms are carbon, or a noncyclic aromatic bivalent organic compound. Also, at least one hydrogen atom on the hetero atom can be substituted by the same substituents as the alkyl group above.

The heteroarylalkyl group is a substituent where a plurality of hydrogen atoms in the heteroaryl group are substituted by alkyl groups. Also, at least one hydrogen atom in the heteroarylalkyl can be substituted by the same substituents as the alkyl group above.

The carbocyclic group is a ring group including 5-10 carbon atoms, like a cyclohexyl group. Also, at least one hydrogen atom in the carbocyclic group can be substituted by the same substituents as the alkyl group above.

The carbocyclic alkyl group is a substituent where a plurality of hydrogen atoms in the carbocyclic group are substituted by alkyl groups. Also, at least one hydrogen atom in the carbocyclic alkyl can be substituted by the same substituents as the alkyl group above.

The heterocyclic group is a ring group formed of 5-10 atoms containing hetero atoms, such as nitrogen, sulfur, phosphorus, oxygen, etc. Also, at least one hydrogen atom in the heterocyclic group can be substituted by the same substituents as the alkyl group above.

The heterocyclic alkyl group is a substituent where a plurality of hydrogen atoms in the heterocyclic alkyl group are substituted with alkyl groups. Also, at least one hydrogen atom in the heterocyclic alkyl group can be substituted with the same substituents as the alkyl group above.

The present invention will be described in greater detail with reference to the following examples. The following examples are for illustrative purposes only and are not intended to limit the scope of the invention.

SYNTHETIC EXAMPLE 1

Preparation of Benzoxazine-based Monomer of Formula 3

1 mol of phenol, 2.2 mol of p-formaldehyde, and 1.1 mol of aniline were mixed, and the mixture was stirred at 110° C. for 1 hour to prepare a crude product.

The crude product was cleaned twice in an aqueous 1N NaOH solution, and then once in distilled water. The cleaned crude product was then dried using magnesium sulfate. Subsequently, the resultant was filtered, and then the solvent was removed therefrom. Next, the resultant product was vacuum dried to obtain a benzoxazine-based monomer of Formula 3 (yield=95%).

SYNTHETIC EXAMPLE 2

Preparation of Benzoxazine-based Monomer of Formula 4

1 mol of tertiarybutylphenol, 2.2 mol of p-formaldehyde, and 1.1 mol of aniline were mixed, and the mixture was stirred at 110° C. for 1 hour without any solvent to prepare a crude product.

The crude product was cleaned twice in an aqueous 1N NaOH solution, and then once in distilled water. The cleaned crude product was then dried using magnesium sulfate. Subsequently, the resultant was filtered, and then the solvent was removed therefrom. Next, the resultant product was vacuum dried to obtain a benzoxazine-based monomer of Formula 4 (yield=95%).

SYNTHETIC EXAMPLE 3

Preparation of Benzoxazine-based Monomer of Formula 5

1 mol of tertiarybutylphenol, 2.2 mol of p-formaldehyde, and 1.1 mol of 3-aminopropylimidazole were mixed, and the mixture was stirred at 110° C. for 1 hour without any solvent in a melted state to prepare a crude product.

The crude product was cleaned twice in an aqueous 1N NaOH solution, and then once in distilled water. The cleaned crude product was then dried using magnesium sulfate. Subsequently, the resultant was filtered, and then the solvent was removed therefrom. Next, the resultant product was vacuum dried to obtain a benzoxazine-based monomer of Formula 5 (yield=95%).

SYNTHETIC EXAMPLE 4

Preparation of Benzoxazine-based Monomer of Formula 13 ($R_2$=aniline)

1 mol of bisphenol A (BP), 4.4 mol of p-formaldehyde, and 2.2 mol of aniline were mixed, and the mixture was stirred at 110° C. for 1 hour to prepare a crude product.

The crude product was cleaned twice in an aqueous 1N NaOH solution, and then once in distilled water. The cleaned crude product was then dried using magnesium sulfate. Subsequently, the resultant was filtered, and then the solvent was removed therefrom. Next, the resultant product was vacuum dried to obtain a benzoxazine-based monomer ($R_2$=aniline) of Formula 13 (yield=95%).

SYNTHETIC EXAMPLE 5

Preparation of Benzoxazine-based Monomer of Formula 14 ($R_2$=aniline)

1 mol of 4,4'-hexafluoroisopropylidene diphenol (4,4'-HFIDPH), 4.4 mol of p-formaldehyde, and 2.2 mol of aniline were mixed, and the mixture was stirred at 110° C. for 1 hour to prepare a crude product.

The crude product was cleaned twice in an aqueous 1N NaOH solution, and then once in distilled water. The cleaned crude product was then dried using magnesium sulfate. Subsequently, the resultant was filtered, and then the solvent was removed therefrom. Next, the resultant product was vacuum dried to obtain a benzoxazine-based monomer of Formula 14 (yield=96%).

SYNTHETIC EXAMPLE 6

Preparation of Benzoxazine-based Monomer of Formula 15 ($R_2$=3-aminopropyl-imidazole)

1 mol of 4,4'-dihydroxybenzophenone, 2.2 mol of p-formaldehyde, and 1.1 mol of 3-aminopropylimidazole were mixed, and the mixture was stirred at 110° C. for 1 hour without any solvent in a melted state to prepare a crude product.

The crude product was cleaned twice in an aqueous 1N NaOH solution, and then once in distilled water. The cleaned crude product was then dried using magnesium sulfate. Subsequently, the resultant was filtered, and then the solvent was removed therefrom. Next, the resultant product was vacuum dried to obtain a benzoxazine-based monomer of Formula 15 (yield=80%).

SYNTHETIC EXAMPLE 7

Preparation of Benzoxazine-based Monomer of Formula 16 ($R_2$=1-(3- aminopropyl)imidazole)

1 mol of bisphenol S (BS), 4.4 mol of p-formaldehyde, and 2.2 mol of 1-(3-aminopropyl) imidazole were mixed, and the mixture was stirred at 110° C. for 1 hour without any solvent in a melted state to prepare a crude product.

The crude product was cleaned twice in an aqueous 1N NaOH solution, and then once in distilled water. The cleaned crude product was then dried using magnesium sulfate. Subsequently, the resultant was filtered, and then the solvent was removed therefrom. Next, the resultant product was vacuum dried to obtain a benzoxazine-based monomer of Formula 16 (yield=98%).

SYNTHETIC EXAMPLE 8

Preparation of Benzoxazine-based Monomer of Formula 17 ($R_2$=allvlamine)

1 mol of 1,1,1-tris(4-hydroxyphenyl) ethane, 6.6 mol of p-formaldehyde, and 3.3 mol of allylamine were mixed, and the mixture was stirred at 110° C. for 1 hour without any solvent in a melted state to prepare a crude product.

The crude product was cleaned twice in an aqueous 1N NaOH solution, and then once in distilled water. The cleaned crude product was then dried using magnesium sulfate. Subsequently, the resultant was filtered, and then the solvent was removed therefrom. Next, the resultant product was vacuum dried to obtain a benzoxazine-based monomer of Formula 17 (yield=95%).

EXAMPLE 1

Preparation of Electrolyte Membrane and Fuel Cells Employing the Same 65 parts by weight of the benzoxazine monomer of Formula 3 prepared in Synthetic Example 1 and 35 parts by weight of polybenzimidazole were blended. The resultant was heated to 220° C. at 20° C./hr. At 220° C., the heated resultant was cured, to synthesize a crosslinked object of the polybenzoxazine-based compound.

The crosslinked object of the polybenzoxazine-based compound was impregnated in an 85 wt % phosphoric acid at 80° C. for 2 hours and 30 min to prepare an electrolyte membrane. Here, the amount of the phosphoric acid was about 500 parts by weight based on 100 parts by weight of the electrolyte membrane.

The electrolyte membrane formed of the crosslinked object of the polybenzoxazine-based compound, impregnated with the phosphoric acid, was placed between electrodes to obtain a membrane electrode assembly (MEA). Three types of electrodes were used as described below.

First, a first electrode was used as a cathode and an anode. The first electrode was prepared by preparing a slurry for forming a catalyst layer by mixing polybenzimidazole, polyvinylidenefluoride, and platinum, and coating the slurry for forming a catalyst layer on a carbon paper, coated with a microporous layer, using a bar coater. The platinum loading amount of the first electrode was 1.0 to 2.0 mg/cm$^2$. The first electrode was used without impregnation. In the following descriptions of aspects of the present invention, "PBI electrode" denotes the first electrode.

Second, an electrode for a phosphoric acid type fuel cell (manufactured by E-TEK) was used as a cathode and an anode. The platinum loading amount of the electrode for a phosphoric acid type fuel cell was 2.0 mg/cm$^2$. The electrode for a phosphoric acid type fuel cell was impregnated in 110 parts by weight of phosphoric acid based on 100 parts by weight of the electrode for a phosphoric acid type fuel cell at 110° C., for 1 hour, in a vacuum, and then again at 110° C. for 10 hours, under a normal pressure.

Third, the first electrode was used as an anode and a second electrode was used as a cathode. The second electrode was prepared by preparing a slurry for forming a catalyst layer by mixing a platinum-cobalt alloy and polyvinylidenefluoride, and coating the slurry for forming a catalyst layer on a carbon paper coated with a microporous layer, using a doctor blade.

The platinum loading amount of the second electrode was 2.2 to 3.5 mg/cm². The second electrode was used without impregnation.

EXAMPLE 2

Preparation of Electrolyte Membrane and Fuel Cells Employing the Same

An electrolyte membrane and fuel cells employing the same were prepared in the same manner as in Example 1, except that the benzoxazine monomer of Formula 4 prepared in Synthetic Example 2 was used instead of the benzoxazine monomer of Formula 3.

EXAMPLE 3

Preparation of Electrolyte Membrane and Fuel Cells Employing the Same

An electrolyte membrane and fuel cells employing the same were prepared in the same manner as in Example 1, except that the benzoxazine monomer of Formula 5 prepared in Synthetic Example 3 was used instead of the benzoxazine monomer of Formula 3.

EXAMPLE 4

Preparation of Electrolyte Membrane and Fuel Cells Employing the Same 65 parts by weight of the benzoxazine monomer of Formula 13 prepared in Synthetic Example 4 and 35 parts by weight of polybenzimidazole were blended. The resultant was heated to 220° C. at 20° C./hr. At 220° C., the heated resultant was cured, to synthesize a crosslinked object of the polybenzoxazine-based compound.

The crosslinked object of the polybenzoxazine-based compound was impregnated in an 85 wt % phosphoric acid at 80° C. for 2 hours and 30 min to prepare an electrolyte membrane. Here, the amount of the phosphoric acid was about 500 parts by weight based on 100 parts by weight of the electrolyte membrane. Three types of electrodes were used, as described below.

First, a first electrode was used as a cathode and an anode. The first electrode was prepared by preparing a slurry for forming a catalyst layer by mixing polybenzimidazole, polyvinylidenefluoride, and platinum, and coating the slurry for forming a catalyst layer on a carbon paper, coated with a microporous layer, using a bar coater. The platinum loading amount of the first electrode was 1.0 to 2.0 mg/cm². The first electrode was used without impregnation. In the following description of aspects of the present invention, "PBI electrode" denotes the first electrode.

Second, an electrode for a phosphoric acid type fuel cell (manufactured by E-TEK) was used as a cathode and an anode. The platinum loading amount of the electrode for a phosphoric acid type fuel cell was 2.0 mg/cm². The electrode for a phosphoric acid type fuel cell was impregnated in 110 parts by weight of phosphoric acid based on 100 parts by weight of the electrode for a phosphoric acid type fuel cell at 110° C., for 1 hour, in a vacuum, and then again at 110° C. for 10 hours, under a normal pressure.

Third, the first electrode was used as an anode and a second electrode was used as a cathode. The second electrode was prepared by preparing a slurry for forming a catalyst layer by mixing a platinum-cobalt alloy and polyvinylidenefluoride, and coating the slurry for forming a catalyst layer on a carbon paper, coated with a microporous layer, using a doctor blade. The platinum loading amount of the second electrode was 2.2 to 3.5 mg/cm². The second electrode was used without impregnation.

EXAMPLE 5

Preparation of Electrolyte Membrane and Fuel Cells Employing the Same

An electrolyte membrane and fuel cells employing the same were prepared in the same manner as in Example 4, except that the benzoxazine monomer of Formula 14 prepared in Synthetic Example 5 was used instead of the benzoxazine monomer of Formula 13.

EXAMPLE 6

Preparation of Electrolyte Membrane and Fuel Cells Employing the Same

An electrolyte membrane and fuel cell employing the same were prepared in the same manner as in Example 4, except that the benzoxazine monomer of Formula 15 prepared in Synthetic Example 6 was used instead of the benzoxazine monomer of Formula 13.

EXAMPLE 7

Preparation of Electrolyte Membrane and Fuel Cells Employing the Same

An electrolyte membrane and a fuel cell employing the same were prepared in the same manner as in Example 4, except that the benzoxazine monomer of Formula 16 prepared in Synthetic Example 7 was used instead of the benzoxazine monomer of Formula 13.

EXAMPLE 8

Preparation of Electrolyte Membrane and Fuel Cells Employing the Same

An electrolyte membrane and a fuel cell employing the same were prepared in the same manner as in Example 4, except that the benzoxazine monomer of Formula 17 prepared in Synthetic Example 8 was used instead of the benzoxazine monomer of Formula 13.

Comparative Example 1

A polybenzimidazole membrane was prepared using PBI CELAZOLE (manufactured by Celanese Corp.), and the polybenzimidazole membrane was impregnated in an 85 wt % phosphoric acid for 4 hours at room temperature.

An MEA was prepared by placing the PBI CELAZOLE poybenzimidazole membrane impregnated with the 85 wt % phosphoric acid between a pair of the first electrodes prepared as in Example 1.

Comparative Example 2

A polybenzimidazole membrane was prepared using PBI CELAZOLE (manufactured by Celanese Corp.), and the polybenzimidazole membrane was impregnated in an 85 wt % phosphoric acid for 4 hours at room temperature.

An MEA was prepared by placing the PBI CELAZOLE poybenzimidazole membrane impregnated with the 85 wt % phosphoric acid between a pair of the electrodes for a phosphoric acid type fuel cell (manufactured by E-TEK) as described in Example 1.

Ionic conductivity with respect to time at a high temperature was measured to analyze a high temperature stability of the electrolyte membranes obtained according to Examples 1-3. In the high temperature ionic conductivity tests, stainless steel metal electrodes were used with the electrolyte membranes obtained in Examples 1-3.

The ionic conductivity was measured as follows. At a frequency in a range of 1 Hz to 1 MHz, a 10 mV (vs. open circuit potential or O.C.V.) voltage bias was applied while measuring resistance. Stainless steel metal electrodes were initially used, and to evaluate reproducibility of the electrolyte membranes, platinum electrodes were subsequently used.

Figure 2:
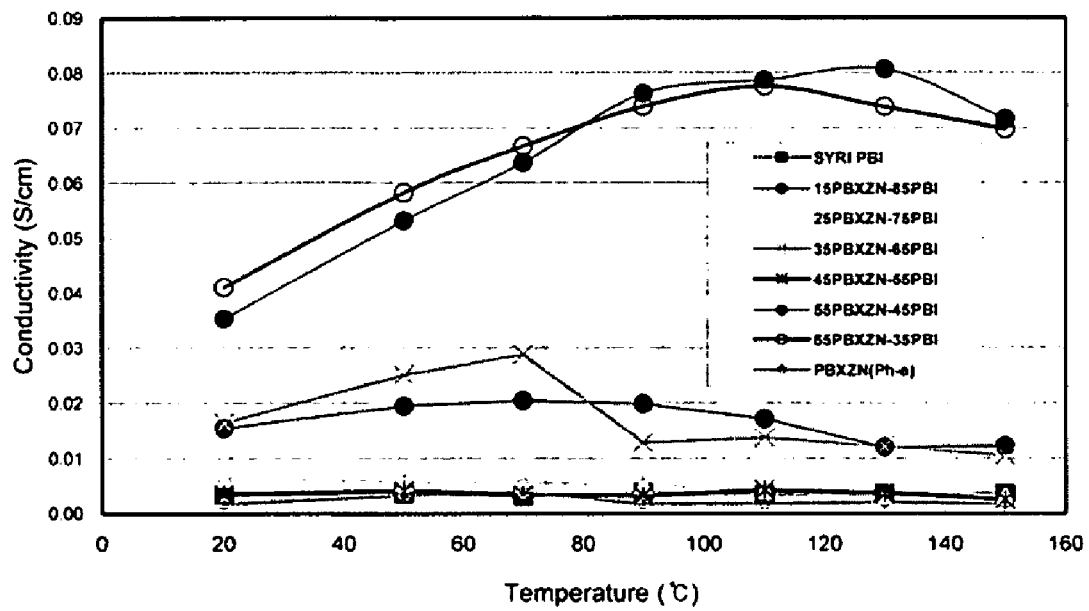
FIGS. 2 through 4 are graphs illustrating ionic conductivity of electrolyte membranes according to embodiments of the present invention.
Figure 3:
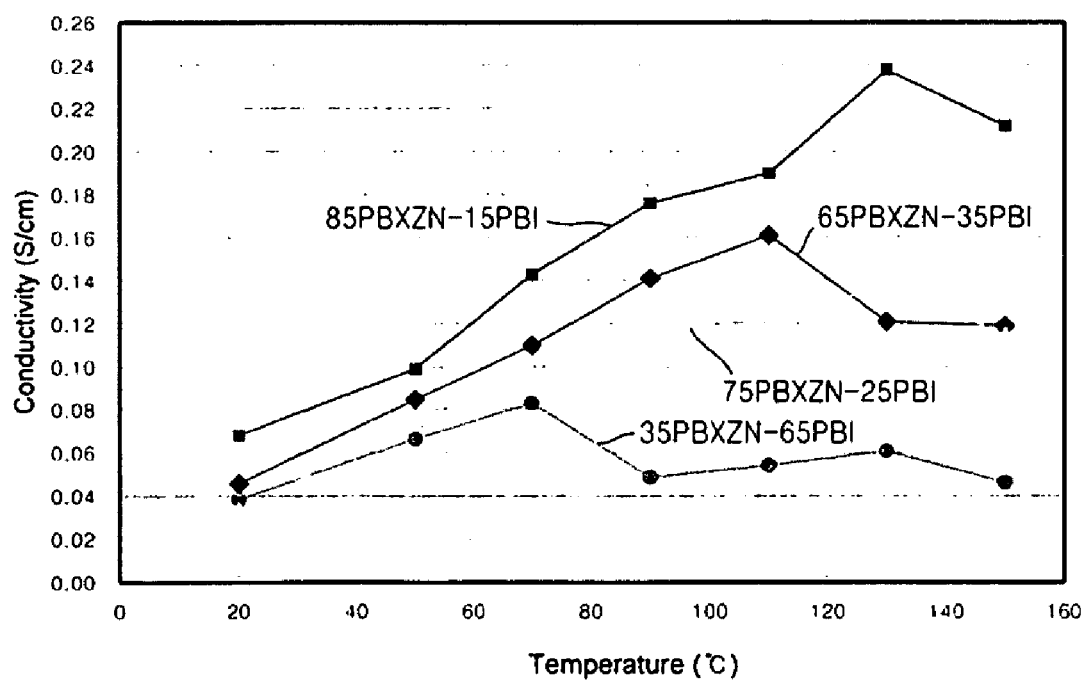
Figure 4:
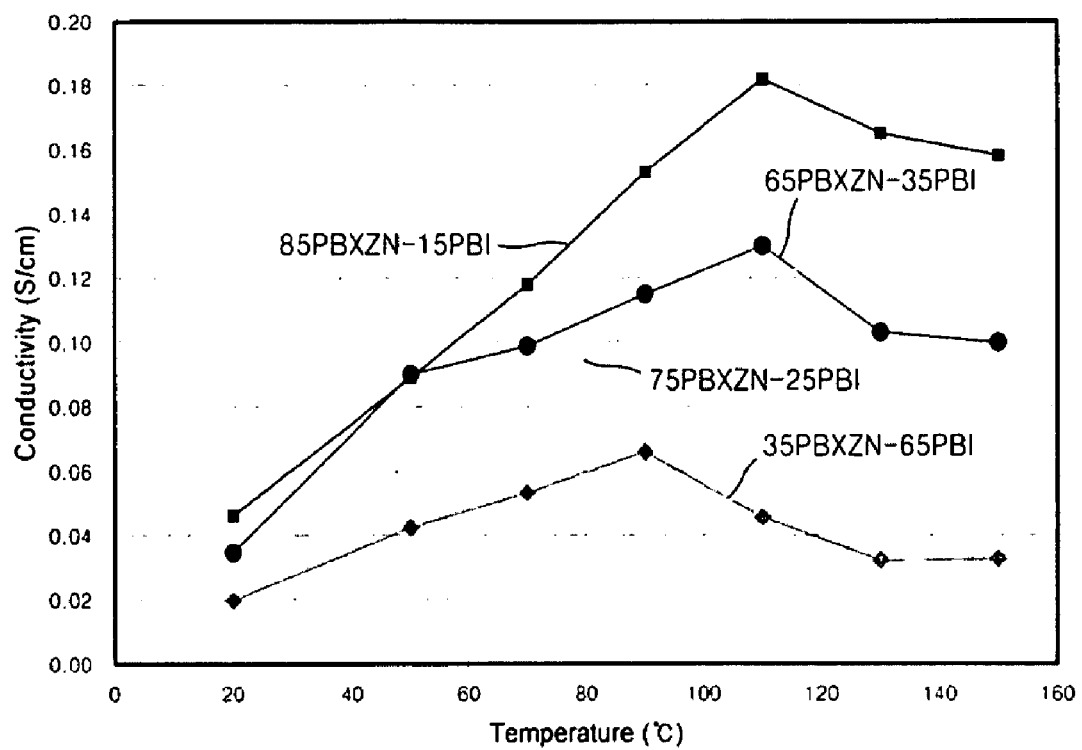

FIGS. 2 through 4 are graphs illustrating ionic conductivity of the electrolyte membranes of Examples 1 through 3 respectively. Referring to FIGS. 2 through 4, crosslinked objects prepared in the same manner as in Example 1, using 15 to 85 parts by weight of the benzoxazine-based compound with respect to the amount of polybenzimidazole had higher proton conductivity than pure polybenzimidazole. When the amount of the benzoxazine-based compound was 85 parts by weight, the crosslinked object obtained had the highest proton conductivity which was at least ten times better than the proton conductivity of a $PBI-H_3PO_4$ electrolyte membrane. The ideal crosslinked object in terms of balancing mechanical strength and conductivity was prepared by using 65 parts by weight of the benzoxazine-based compound and 35 parts by weight of the polybenzimidazole.

SYRI PBI in FIG. 2 is the pure polybenzimidazole without the benzoxazine-based compound. 15PBXZN-85PBI is a polymer electrolyte prepared by using 15 parts by weight of the benzoxazine-based monomer and 85 parts by weight of polybenzimidazole. 75PBXZN-25PBI is a polymer electrolyte prepared by using 75 parts by weight of the benzoxazine-based monomer and 25 parts by weight of polybenzimidazole. Phenol aniline was used as a benzoxazine-based monomer in FIG. 2, tertiary butyl phenol aniline was used as the benzoxazine-based monomer in FIG. 3, and tertiary butyl phenol amino-imidazole was used as the benzoxazine-based monomer in FIG. 4.

Performances of the fuel cells prepared in Examples 2-4 and Comparative Examples 1-2 were analyzed by evaluating the initial properties of the fuel cells and re-evaluating the fuel cells after operating at 0.2 A/cm$^2$ for 16 hours. In fuel cells of Examples 2-4, a pair of the first electrodes, the first electrode as an anode and the second electrode as a cathode, and a pair of the electrodes for a phosphoric acid type fuel cell (manufactured by E-TEK) were respectively used.

Here, performances were analyzed by measuring voltage with respect to current density for each fuel cell. Also, resistance was analyzed by measuring alternating current resistance at 1 kHz. The resistance performance analyses of the fuel cells were performed without supplying hydrogen fuel or air, while maintaining the fuel cell temperature at 150° C. When the polybenzimidazole electrode or the air electrode including the PtCo catalyst as prepared in Example 4 was used in the fuel cell, current-voltage properties were measured at 100 ccm (cm$^3$/min) of hydrogen flow rate and 200 ccm of air flow rate. When the electrodes for a phosphoric acid type fuel cell (manufactured by E-TEK) was used in the fuel cell, current-voltage properties were measured at 100 ccm of hydrogen flow rate and 300 ccm of air flow rate.

Figure 5:
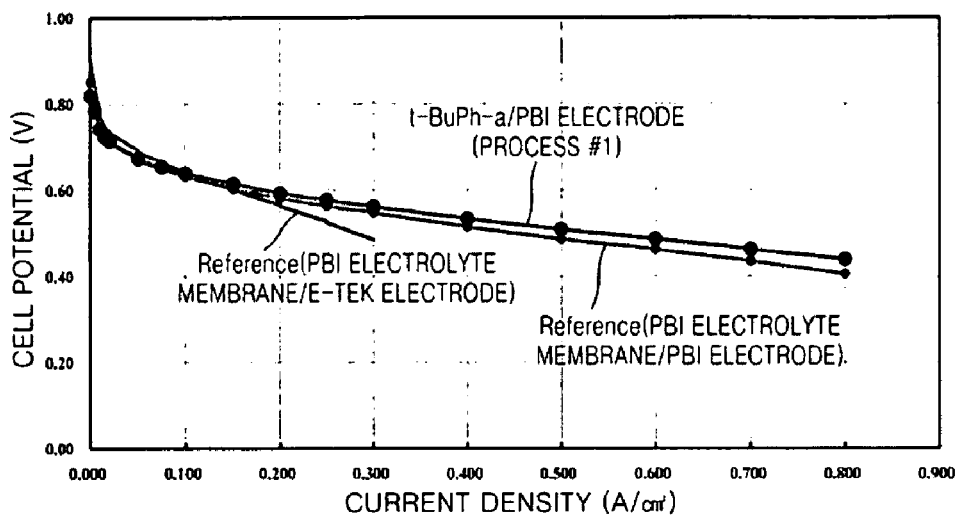
FIGS. 5 through 7 are graphs illustrating cell performances of fuel cells according to embodiments of the present invention.
Figure 6:
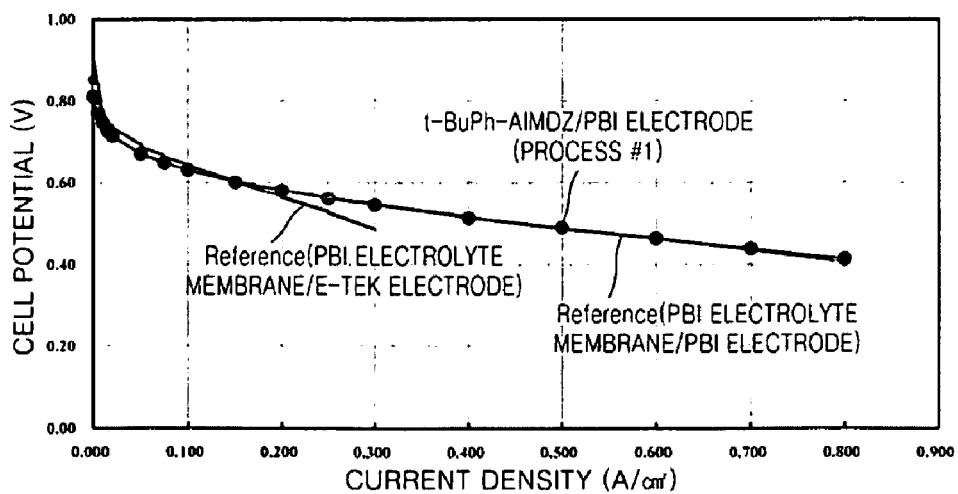
Figure 7:
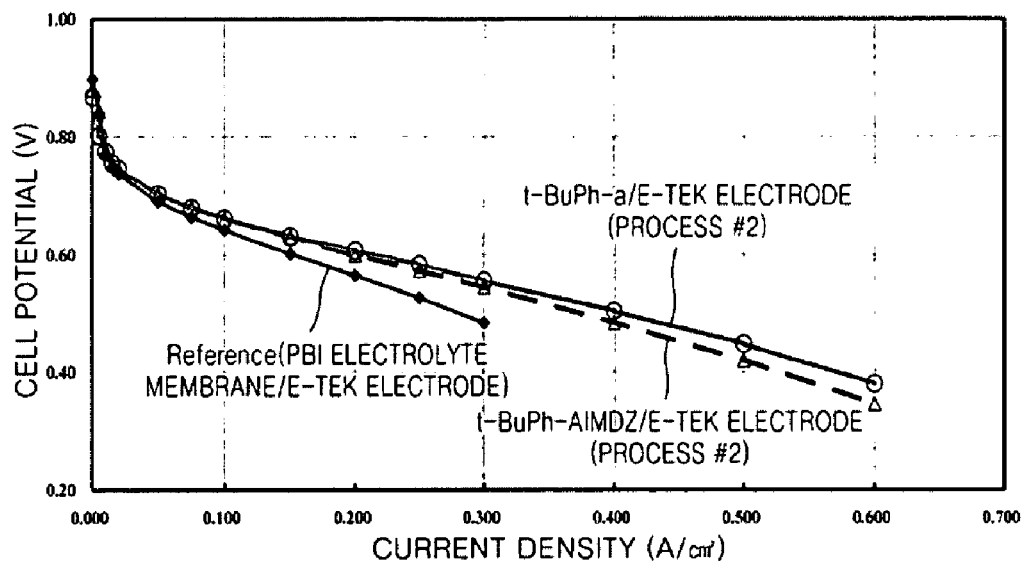

FIGS. 5 through 7 are graphs illustrating cell performances of fuel cells prepared in Example 1 and Comparative Examples 1 and 2. In fuel cells of Example 1, a pair of the first electrodes, the first electrode as an anode and the second electrode as a cathode, and a pair of the electrodes for a phosphoric acid type fuel cell (manufactured by E-TEK) were used, as mentioned above.

Referring to FIGS. 5 through 7, the fuel cell employing the polymer electrolyte membrane, prepared using tertiary butyl phenol aniline as the benzoxazine-based monomer compound, had excellent MEA performance compared to the fuel cell employing the $PBI-H_3PO_4$ electrolyte membrane. The fuel cell employing the polymer electrolyte membrane, using tertiary butyl phenol amino-imidazole, had a similar MEA performance compared to the fuel cell employing the PBI-phosphoric acid electrolyte membrane. When the MEA performances were analyzed using the fuel cells employing the E-TEK electrodes impregnated with polyphosphoric acid (105wt % phosphoric acid), current-voltage performance were superior in both polymer electrolyte membranes using tertiary butyl phenol aniline and tertiary butyl phenol amino-imidazole as benzoxazine-based monomer compounds. The low MEA performance of the PBI-phosphoric acid Comparative Example 2 is due to gas permeation, which is caused because polyphosphoric acid in the electrode dissolves polybenzimidazole. Because E-TEK electrodes are treated to repulse water, phosphoric acid is inhibited from migration to the electrodes, and as a result, excess phosphoric acid remains in the electrolyte membrane. As the temperatures rises, excess phosphoric acid is changed into polyphosphoric acid which dissolves the PBI membrane.

Using the E-TEK electrode impregnated with polyphosphoric acid, a chemical stability of the electrolyte membrane can be analyzed. Accordingly, the polymer electrolyte membrane including the crosslinked object of the polybenzoxazine-based compound has excellent chemical stability in polyphosphoric acid.

Reference (PBI electrolyte membrane/PBI electrode) in FIGS. 5 and 6 is the MEA employing the PBI electrode and the PBI-phosphoric electrolyte membrane prepared in Comparative Example 1. Also, another reference (PBI electrolyte membrane/E-TEK electrode) in FIGS. 5 and 6 is the MEA prepared in Comparative Example 2. In FIG. 5, t-BuPh-a/PBI electrode (process #1) is the electrode prepared in Example 2. In FIG. 6, t-BuPh-AIMDZ/PBI electrode (process #1) is the electrode prepared in Example 3.

In FIG. 7, Reference (PBI electrolyte membrane/E-TEK electrode) is the MEA prepared in Comparative Example 2. t-BuPh-AIMDZ/E-TEK electrode (process #2) is the MEA employing the polymer electrolyte membrane prepared in Example 3 and the electrodes for a phosphoric acid type fuel cell (manufactured by E-TEK) having a platinum loading amount of 2 mg/cm$^2$ as hydrogen and air electrodes. t-BuPh-a/E-TEK electrode (process #2) is the MEA employing the polymer electrolyte prepared in Example 2 and electrodes for a phosphoric acid type fuel cell (manufactured by E-TEK) having a platinum loading amount of 2 mg/cm$^2$ as hydrogen and air electrodes.

Figure 8:
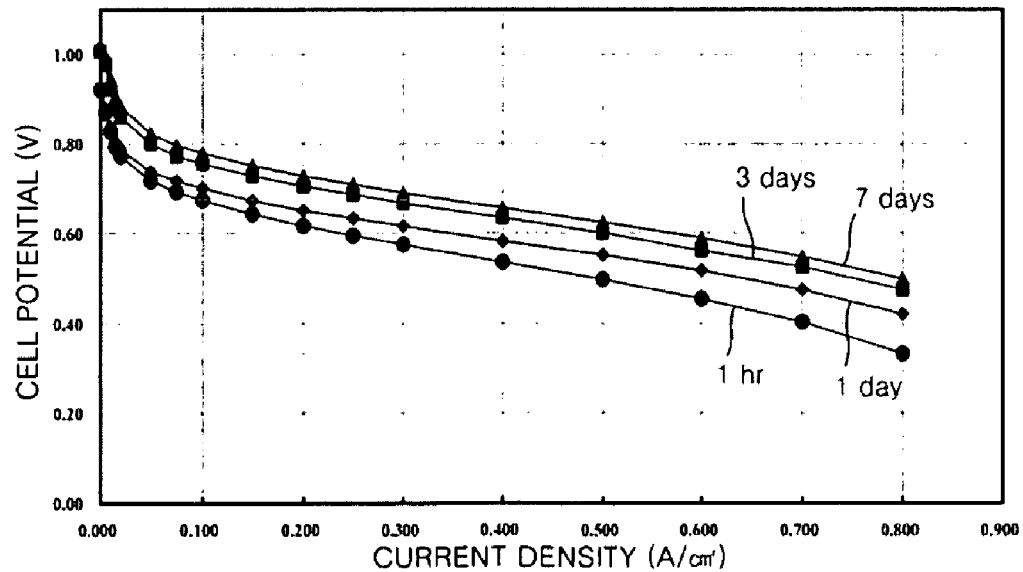
FIG. 8 is a graph illustrating cell performance with respect to time of a fuel cell according to an embodiment of the present invention.

FIG. 8 is a graph of cell performance with respect to time of the fuel cell prepared in Example 4.

Referring to FIG. 8, by including the platinum-cobalt catalyst in the air electrode, the cell performance of the fuel cell has improved by 150 mV or more. Also, the open circuit potential continuously increased for 7 days and then stabilized. That is, an electric potential reduction due to gas permeation was not observed for at least 150 hours. Accordingly, the crosslinked object including polybenzoxazine had superior chemical stability. Also, the fuel cell exhibits an excellent performance of 0.7 V cell potential at 0.3 A/cm² current density under high temperature and non humidity conditions.

Figure 12:
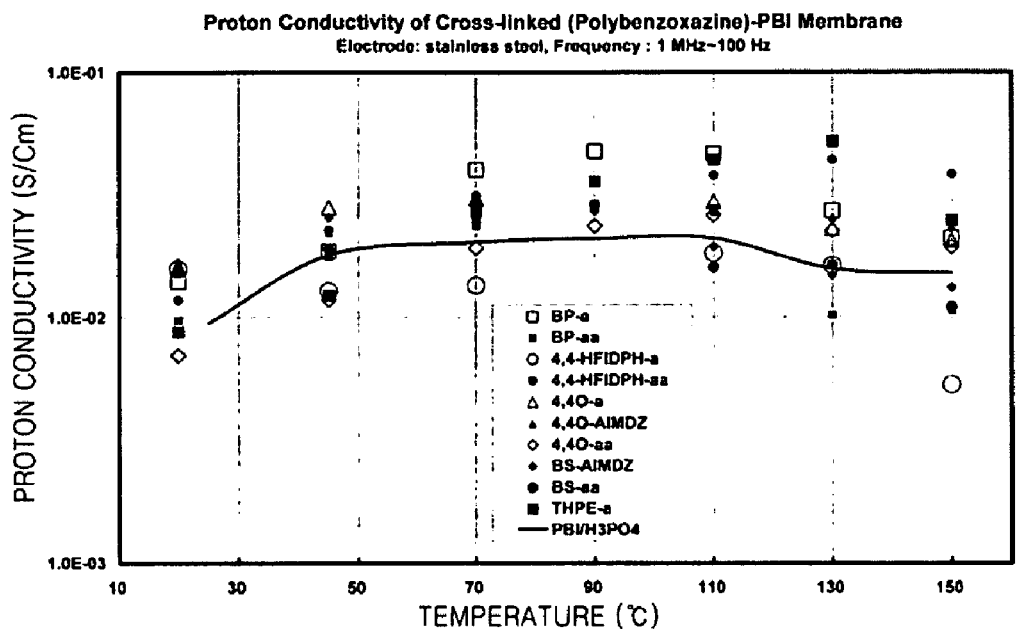
FIG. 12 is a graph illustrating ionic conductivity of electrolyte membranes according to embodiments of the present invention.

FIG. 12 is a graph illustrating ionic conductivity of the electrolyte membranes prepared in Examples 4 through 8. Here, in Examples 4 through 8, stainless steel metal electrodes were used. Referring to FIG. 12, most of the electrolyte membranes including the various crosslinked objects of the polybenzoxazine-based compounds had relatively high proton conductivity compared to the polybenzimidazole electrolyte membrane. In FIG. 12, □ BP-a is when bisphenol A-aniline was used, ○ 4,4-HFIDPH-a is when 44'-hexafluoroisopropylidene diphenol-aniline was used, Δ 4,4O-a is when 44'-dihydroxybenzophenone-aniline was used, ◇ 4,4O-aa is when 44'- dihydroxybenzophenone-arylamine was used, ● BS-aa is when bisphenol S-allyl amine was used, ■ BP-aa is when bisphenol A-allyl amine was used, ● 4,4-HFIDPH-aa is when 44'-hexafluoroisopropylidene diphenol-allyl amine was used, ▲ 4,4O-AIMDZ is when 44'-44'-dihydroxybenzophenone-1-(3-aminopropyl) imidazole was used, ♦ BS-AIMDZ is when bisphenol S-1-(3-aminopropyl) imidazole was used, and ■ THPE-a is when (1,1,1-Tris(4-hydroxyphenyl) ethane(THPE)-aniline) was used to synthesize the crosslinked object of the poly benzoxazine based compound.

Performances of the fuel cells prepared in Examples 5-8 and Comparative Examples 1-2 were analyzed by evaluating the initial properties of the fuel cells and re-evaluating the fuel cells after operating at 0.3 A/cm² for 16 hours. Here, performances were analyzed by measuring voltage with respect to current density. Also, resistance was analyzed by measuring alternating current resistance at 1 kHz. The resistance performance analyses of the fuel cells were performed without supplying hydrogen fuel and air, while maintaining the fuel temperature at 150° C. When the polybenzimidazole electrode or the air electrode including the PtCo catalyst as given in Example 4 was used in the fuel cells, current-voltage properties were measured at a hydrogen flow rate of 100 ccm (cm³/min) and an air flow rate of 200 ccm.

Figure 13:
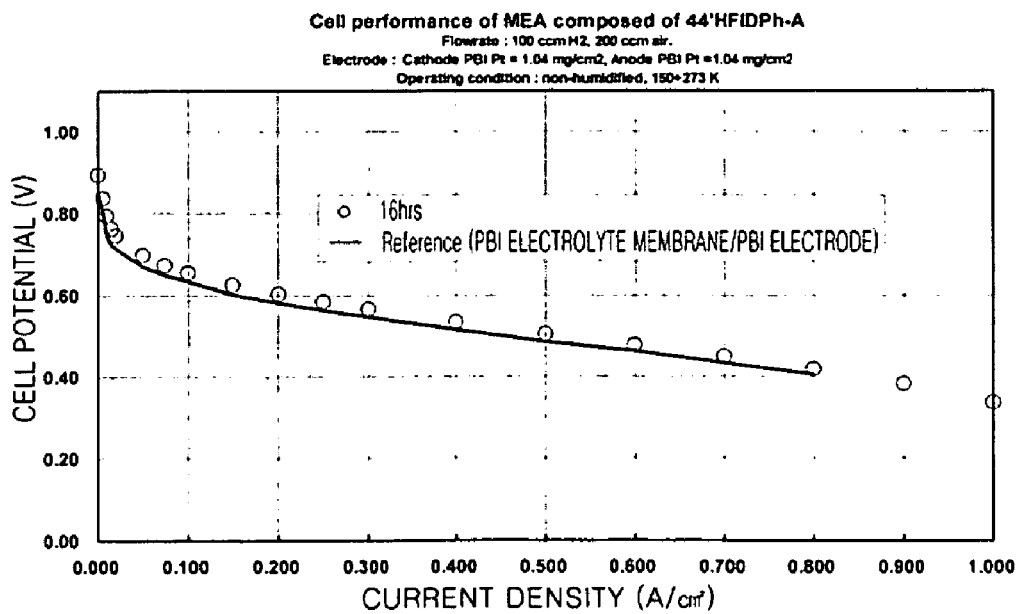
FIGS. 13 through 15 are graphs illustrating cell performance of fuel cells according to embodiments of the present invention.
Figure 14:
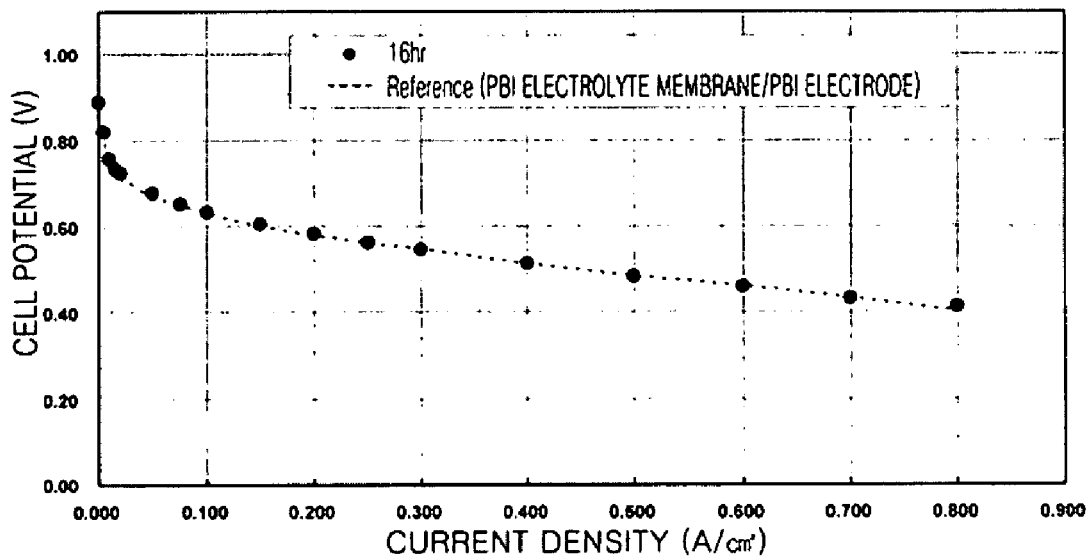
Figure 15:
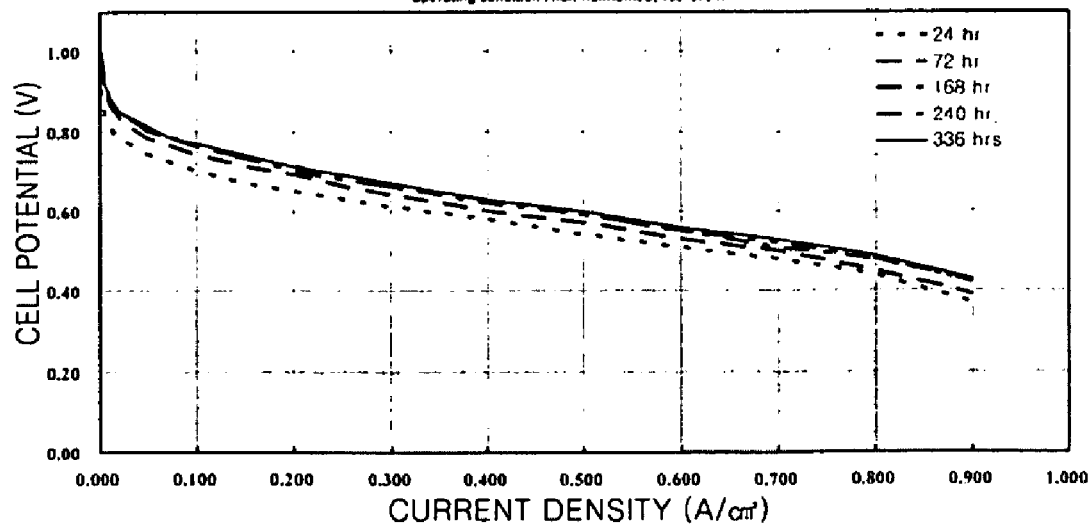

FIGS. 13 through 15 are graphs showing cell performance of fuel cells prepared in Example 5 and Comparative Example 1. In FIGS. 13 and 14 a pair of the first electrodes was used, and in FIG. 15, the first electrode as an anode and the second electrode as a cathode was used in the fuel cell of Example 5.

Referring to FIGS. 13 and 14, the MEAs prepared using 44HFIDPh-a monomer and 44HFIDPh-aa BOA monomer had the same or relatively superior cell performance at 150° C. compared to the PBI electrode MEA which was set as a reference. FIG. 15 is a graph showing cell performance of the fuel cell with respect to operating time, where the fuel cell was formed using the crosslinked compound of polybenzimidazole and the polymerized resultant of the 44HFIDPh-a monomer, and specifically, by using the air electrode of PtCo and polyvinylindenefluoride.

Referring to FIGS. 13 through 15, the fuel cell prepared in Example 5 had excellent performance compared to the fuel cell prepared in Comparative Example 1.

The fuel cell prepared in Example 5 had superior performance at 0.3 A/cm² with an operating voltage of 0.67 V for 330 hours. Also, the fuel cell prepared in Example 5 had excellent durability without any voltage drop.

The crosslinked object of the polybenzoxazine-based compound has a large acid trapping capacity with respect to the benzoxazine-based compound and high mechanical properties due to the crosslinking. Also, the crosslinked object is no longer soluble in polyphosphoric acid, and thus the crosslinked object is very stable chemically. The electrolyte membrane including the crosslinked object has excellent phosphoric acid supplementing capacity at a high temperature and mechanical and chemical stability. The crosslinked object of the polybenzoxazine-based compound can be obtained by a simple polymerization process using heat instead of using a polymerization initiator or a cross-linking agent. Also, an additional cross-linking agent is not needed, and thus mass production is possible. Also, the costs of the starting materials used when synthesizing the crosslinked object are reasonable, and thus expenses are reasonable.

The electrolyte membrane including the crosslinked object of the polybenzoxazine-based compound according to aspects of the present invention can be used in a fuel cell for a high temperature and no humidity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte membrane, comprising a crosslinked polybenzoxazine-based material that is a polymerized resultant product of a first benzoxazine-based monomer represented by Formula 1 below or a second benzoxazine-based monomer represented by Formula 2 below with a crosslinkable compound:

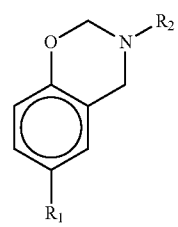

Formula 1 wherein R₁ is hydrogen, a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C2-C20 heteroaryl group, a substituted or nonsubstituted C4-C20 cycloalkyl group or a substituted or nonsubstituted C2-C20 heterocyclic group, a halogen atom, a hydroxyl group, or a cyano group; and R₂ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group;

Formula 2

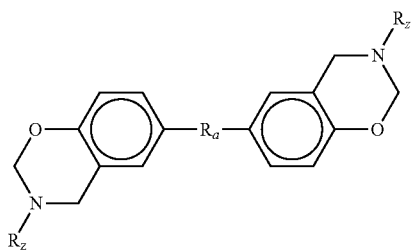

wherein, R₂ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group; and R₃ is a substituted or nonsubstituted C1-C20 alkylene group, a substituted or nonsubstituted C1-C20 alkenylene group, a substituted or nonsubstituted C1-C20 alkynylene group, a substituted or nonsubstituted C6-C20 arylene group, a substituted or nonsubstituted C2-C20 heteroarylene group, —C(=O)—, or —SO₂—.

2. The electrolyte membrane of claim 1, further comprising a proton conductor.

3. The electrolyte membrane of claim 2, wherein the proton conductor is at least one selected from the group consisting of phosphoric acid and C1-C10 alkyl phosphoric acid; and the amount of the proton conductor is in a range of 100 to 1,000 parts by weight based on 100 parts by weight of the crosslinked polybenzoxazine-based material.

4. The electrolyte membrane of claim 1, wherein R₁ of Formula 1 is a C1-C10 alkyl group, an allyl group, a C6-C20 aryl group, a tertbutyl group, a C1-C10 alkenyl group, or a C1-C10 alkynyl group.

5. The electrolyte membrane of claim 1, wherein R₂ of Formulas 1 and 2 is —CH₂.CH=CH₂,

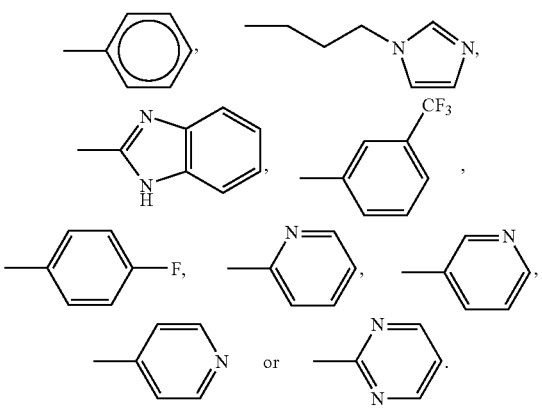

6. The electrolyte membrane of claim 1, wherein R₃ of Formula 2 is —C(CH₃)₂—, —C(CF₃)₂—, —C(=O)—, —SO₂—, —CH₂—, —C(CCl₃)—, —CH(CH₃)—, —CH(CF₃)—, or

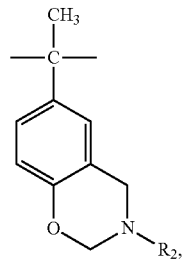

, wherein, R₂ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group.

7. The electrolyte membrane of claim 1, wherein Formula 1 is represented by Formulas 3 through 12 below:

(3)

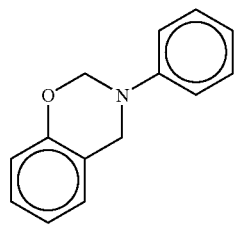

(4)

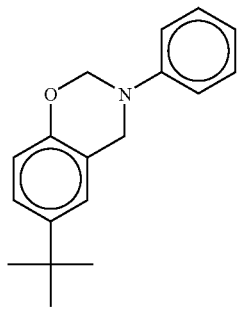

(5)

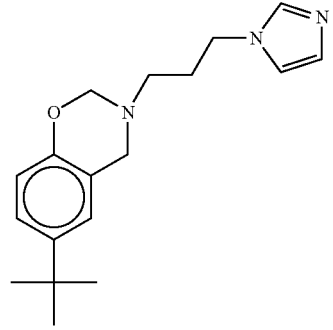

(6)
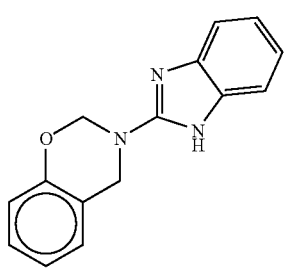
(7)
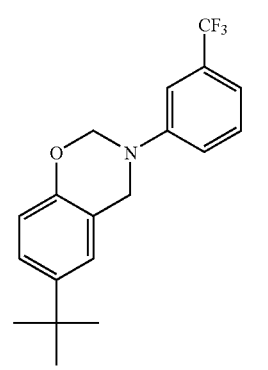
(8)
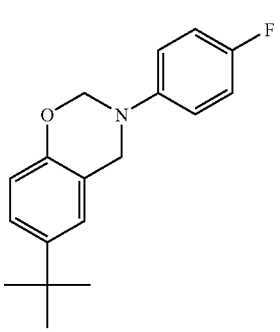
(9)
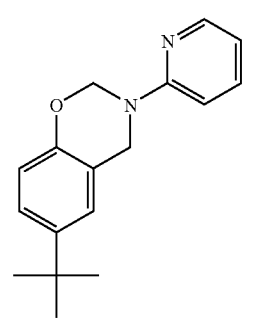
(10)
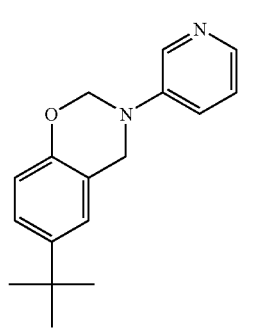
(11)
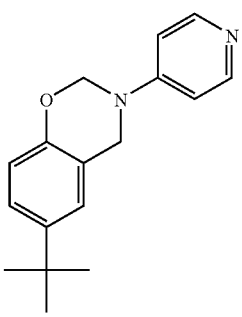
(12)
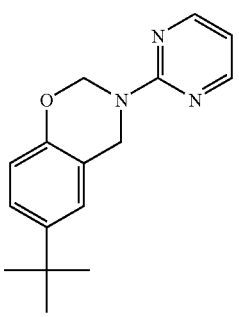
Formula 4
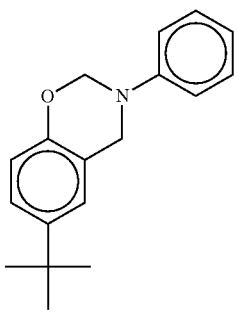
Formula 5
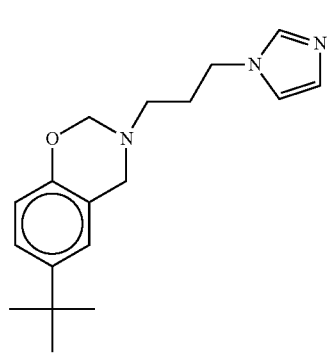

Formula 6
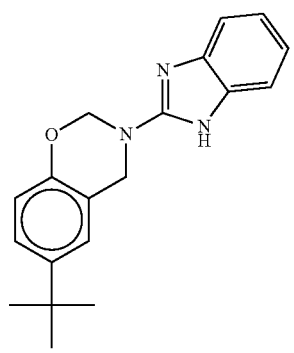
Formula 7
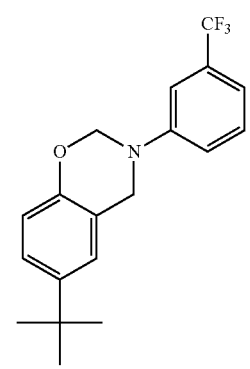
Formula 8
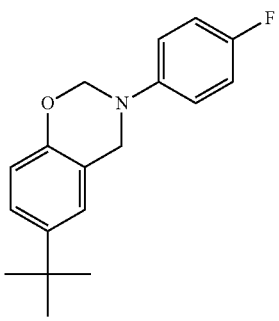
Formula 9
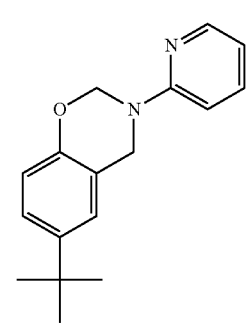
Formula 10
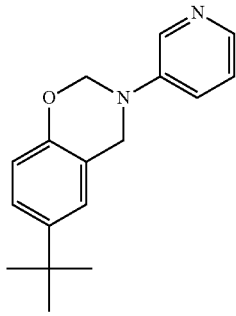
Formula 11
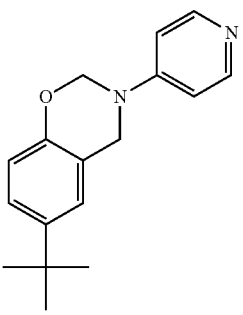
Formula 12
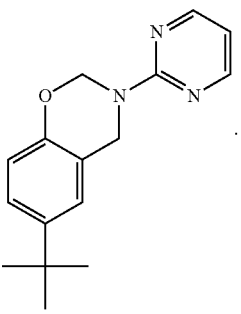
8. The electrolyte membrane of claim 1, wherein Formula 2 is selected from the group consisting of Formulas 13 through 17 below:
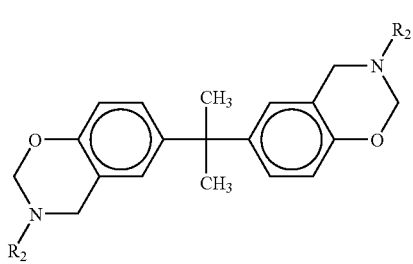
(13)

-continued

(14)
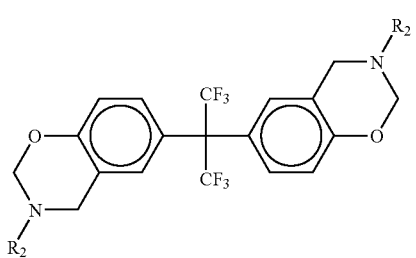

(15)
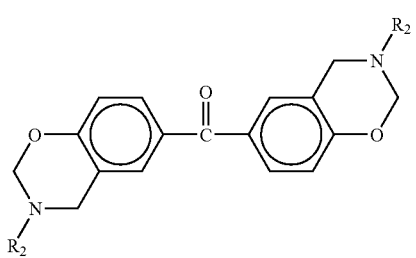

(16)
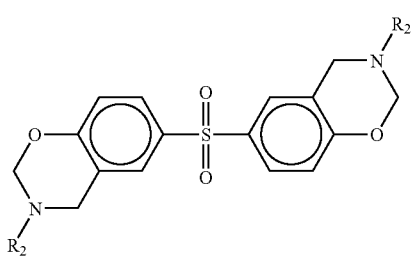

(17)
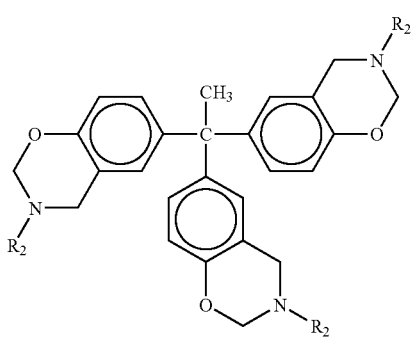

wherein,
R$_2$ is —CH$_2$—CH=CH$_2$,

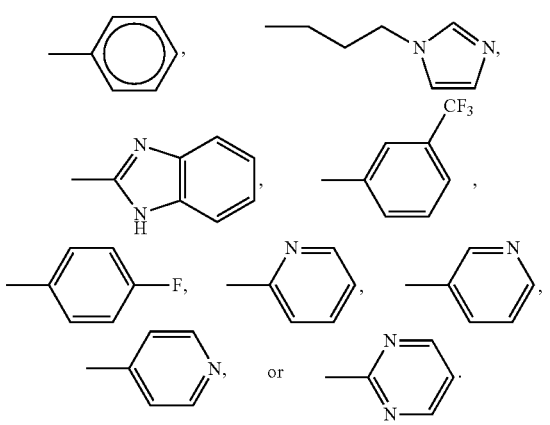

9. The electrolyte membrane of claim 1, wherein an amount of the crosslinkable compound is in a range of 5 to 95 parts by weight based on 100 parts by weight of the first benzoxazine-based monomer or the second benzoxazine-based monomer.

10. An electrolyte membrane, comprising a crosslinked polybenzoxazine-based material that is a polymerized resultant product of a first benzoxazine-based monomer represented by Formula 1 below or a second benzoxazine-based monomer represented by Formula 2 below:

Formula 1

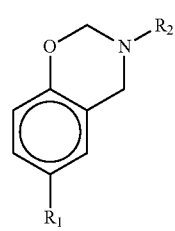

wherein R$_1$ is hydrogen, a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C2-C20 heteroaryl group, a substituted or nonsubstituted C4-C20 cycloalkyl group or a substituted or nonsubstituted C2-C20 heterocyclic group, a halogen atom, a hydroxyl group, or a cyano group; and R$_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group;

Formula 2

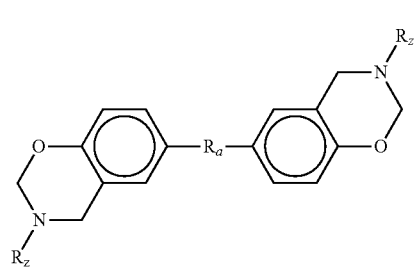

wherein, R$_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group; and R₃ is a substituted or nonsubstituted C1-C20 alkylene group, a substituted or nonsubstituted C1-C20 alkenylene group, a substituted or nonsubstituted C1-C20 alkynylene group, a substituted or nonsubstituted C6-C20 arylene group, a substituted or nonsubstituted C2-C20 heteroarylene group, —C(=O)—, or —SO₂—.

11. The electrolyte membrane of claim 10, wherein Formula 1 is represented by Formulas 3 through 12 below:

Formula 3

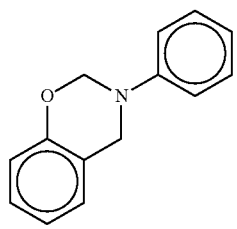

Formula 4

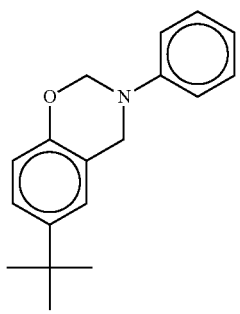

Formula 5

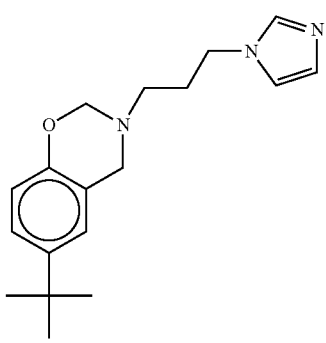

Formula 6

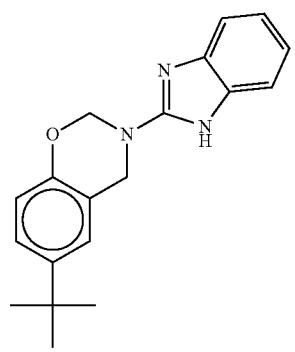

Formula 7

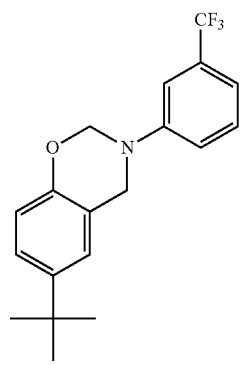

Formula 8

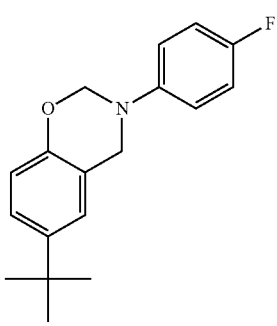

Formula 9

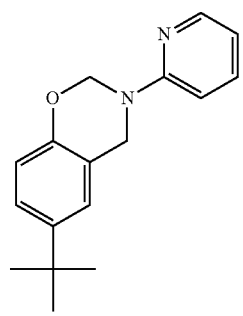

Formula 10

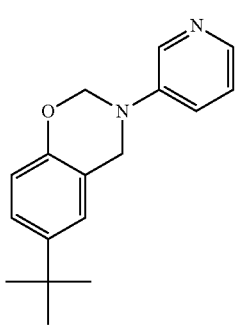

Formula 11

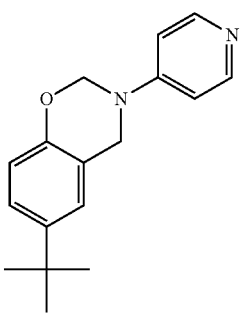

Formula 12

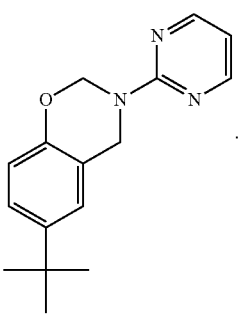

12. A membrane electrode assembly (MEA) comprising:
an anode comprising:
   an anode support, and
   an anode catalyst layer on the support;
a cathode comprising:
   a cathode support, and
   a cathode catalyst layer on the support; and
the electrolyte membrane of claim 3,
wherein the anode is laminated on one side of the electrolyte membrane and the cathode is laminated on the other side of the electrolyte membrane.

13. The MEA of claim 12, wherein the anode catalyst layer comprises a platinum-cobalt alloy having a platinum loading at and between 2.2 to 3.5 mg/cm³.

14. A high temperature no humidity fuel cell comprising the MEA of claim 12; and a bipolar plate attached to each side of the MEA.

15. A fuel cell employing an electrolyte membrane, comprising the crosslinked polybenzoxazine-based material of claim 1.

16. The electrolyte membrane of claim 10, wherein $R_3$ of Formula 2 is —C(CH$_3$)$_2$—, —C(CF$_3$)$_2$—, —C(=O)—, —SO$_2$—, —CH$_2$—, —C(CCl$_3$)—, —CH(CH$_3$)—, —CH(CF$_3$)—, or

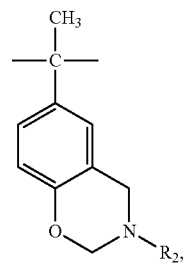

wherein, $R_2$ is a substituted or nonsubstituted C1-C20 alkyl group, a substituted or nonsubstituted C1-C20 alkenyl group, a substituted or nonsubstituted C1-C20 alkynyl group, a substituted or nonsubstituted C6-C20 aryl group, a substituted or nonsubstituted C7-C20 arylalkyl group, a substituted or nonsubstituted C2-C20 heteroaryl group, a substituted or nonsubstituted C2-C20 heteroarylalkyl group, a substituted or nonsubstituted C4-C20 carbocyclic group, a substituted or nonsubstituted C4-C20 carbocyclic alkyl group, a substituted or nonsubstituted C2-C20 heterocyclic group, or a substituted or nonsubstituted C2-C20 heterocyclic alkyl group.

17. The electrolyte membrane of claim 10, further comprising a proton conductor.

18. The electrolyte membrane of claim 17, wherein the proton conductor is at least one selected from the group consisting of phosphoric acid and C1-C10 alkyl phosphoric acid; and an amount of the proton conductor is in a range of 100 to 1,000 parts by weight based on 100 parts by weight of the crosslinked polybenzoxazine-based material.

19. A fuel cell employing an electrolyte membrane, comprising the crosslinked polybenzoxazine-based material of claim 10.

20. The electrolyte membrane of claim 10, wherein $R_1$ of Formula 1 is a C1-C10 alkyl group, an aryl group, a C6-C20 aryl group, a tertbutyl group, a C-C10 alkenyl group, or a C1-C10 alkynyl group.

21. The electrolyte membrane of claim 10, wherein $R_2$ of Formula 1 and $R_2$ of Formula 2 are independently —CH$_2$—CH=CH$_2$,

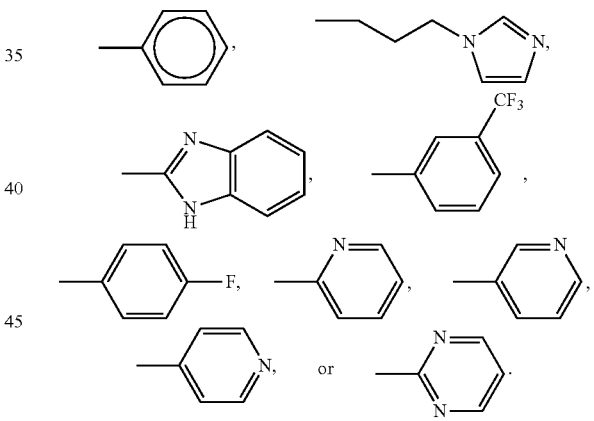

22. The electrolyte membrane of claim 10, wherein Formula 2 is selected from the group consisting of Formulas 13 through 17 below:

Formula 13

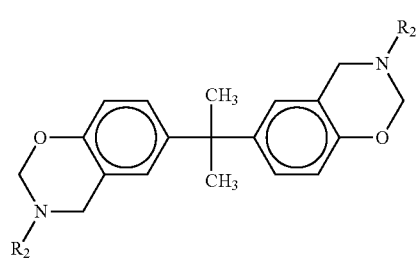

Formula 14

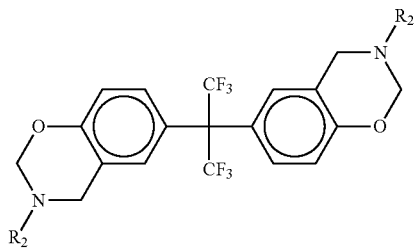

Formula 15

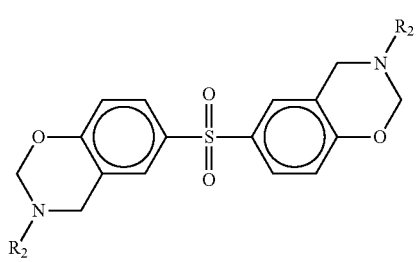

Formula 16

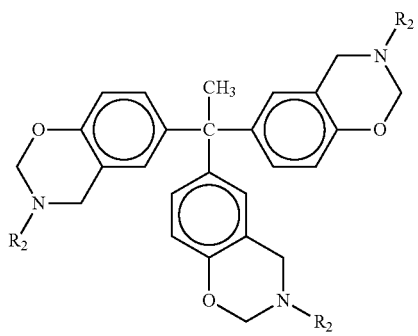

wherein,

R₂ is —CH₂—CH=CH₂,

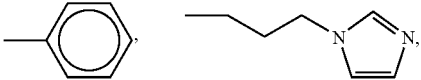

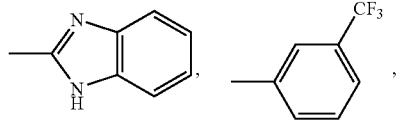

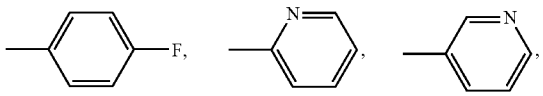

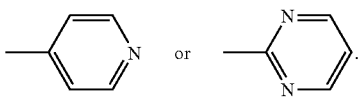

23. A membrane electrode assembly (MEA) comprising:
the electrolyte membrane of claim 17;
an anode comprising:
an anode support, and
an anode catalyst layer on the support; and
a cathode comprising:
a cathode support, and
a cathode catalyst layer on the support;
wherein the anode is laminated on one side of the electrolyte membrane and the cathode is laminated on the other side of the electrolyte membrane.

24. The MEA of claim 23, wherein the anode catalyst layer comprises a platinum-cobalt alloy having a platinum loading at or between 2.2 to 3.5 mg/cm³.

25. A high temperature no humidity fuel cell comprising the MEA of claim 23; and a bipolar plate attached to each side of the MEA.

* * * * *